US011215699B2

(12) United States Patent
Masuda et al.

(10) Patent No.: US 11,215,699 B2
(45) Date of Patent: Jan. 4, 2022

(54) LAMP DEVICE

(71) Applicant: KOITO MANUFACTURING CO., LTD., Tokyo (JP)

(72) Inventors: Takeshi Masuda, Shizuoka (JP); Hiroki Inoue, Shizuoka (JP); Yusuke Kasaba, Shizuoka (JP); Misako Kamiya, Shizuoka (JP); Teruaki Yamamoto, Shizuoka (JP); Minami Katagiri, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 263 days.

(21) Appl. No.: 16/474,187

(22) PCT Filed: Dec. 27, 2017

(86) PCT No.: PCT/JP2017/046994
§ 371 (c)(1),
(2) Date: Jun. 27, 2019

(87) PCT Pub. No.: WO2018/124206
PCT Pub. Date: Jul. 5, 2018

(65) Prior Publication Data
US 2019/0346538 A1    Nov. 14, 2019

(30) Foreign Application Priority Data

Dec. 28, 2016 (JP) .............................. JP2016-256296
Dec. 28, 2016 (JP) .............................. JP2016-256297

(51) Int. Cl.
*G01S 7/481* (2006.01)
*F21S 41/40* (2018.01)
(Continued)

(52) U.S. Cl.
CPC ............. *G01S 7/4813* (2013.01); *F21S 41/40* (2018.01); *F21V 15/01* (2013.01); *G01S 17/08* (2013.01)

(58) Field of Classification Search
CPC .......... G01S 7/4813; G01S 7/08; F21S 41/40; F21V 15/01
See application file for complete search history.

(56) References Cited

U.S. PATENT DOCUMENTS

2001/0024171 A1   9/2001  Nishimura
2002/0003473 A1   1/2002  Makita et al.
(Continued)

FOREIGN PATENT DOCUMENTS

CN    105711588 A     6/2016
JP    2001-260777 A   9/2001
(Continued)

OTHER PUBLICATIONS

International Search Report dated Mar. 20, 2018 by the International Searching Authority in counterpart International Patent Application No. PCT/JP2017/046994. (PCT/ISA/210).
(Continued)

*Primary Examiner* — Anabel Ton
(74) *Attorney, Agent, or Firm* — Sughrue Mion, PLLC

(57) ABSTRACT

A lamp housing (143) houses a light source (141). A front sensor housing (152) houses a front LiDAR sensor (151). A supporting unit (17) supports the lamp housing (143) and the front sensor housing (152). The lamp housing (143) and the front sensor housing (152) are arranged in a direction corresponding to a left-right direction of a vehicle, when viewed from a direction corresponding to a front-rear direction of the vehicle. A maximum dimension (UD1) of the lamp housing (143) in an up-down direction of the vehicle
(Continued)

is smaller than a maximum dimension (UD2) of the front sensor housing (152) in the same direction.

32 Claims, 17 Drawing Sheets

(51) Int. Cl.
  *F21V 15/01* (2006.01)
  *G01S 17/08* (2006.01)

(56) References Cited

U.S. PATENT DOCUMENTS

| 2009/0219191 A1 | 9/2009 | Natsume et al. |
| 2009/0295906 A1 | 12/2009 | Kushimoto et al. |
| 2019/0275923 A1* | 9/2019 | Fushimi ................. F21V 23/00 |

FOREIGN PATENT DOCUMENTS

| JP | 2002-19517 A | 1/2002 |
| JP | 2015-76352 A | 4/2015 |
| JP | 2016-187990 A | 11/2016 |
| WO | 2008/024639 A2 | 2/2008 |

OTHER PUBLICATIONS

Written Opinion dated Mar. 20, 2018 by the International Searching Authority in counterpart International Patent Application No. PCT/JP2017/046994. (PCT/ISA/237).

Communication dated Jul. 21, 2020 issued by the European Intellectual Property Office in counterpart European Application No. 17889388.9.

Communication dated Nov. 30, 2020 issued by the State Intellectual Property Office of P.R. China in English counterpart Chinese Application No. 201780080684.2.

* cited by examiner

LAMP DEVICE

TECHNICAL FIELD

The present invention relates to a lamp device adapted to be mounted on a vehicle.

BACKGROUND ART

In order to realize a self-driving technique of a vehicle, sensors for obtaining external information of the vehicle shall be mounted on a vehicle body. It is known a lamp device wherein such a sensor is arranged in a lamp housing containing a light source for emitting light towards a predetermined area around the vehicle (see Patent Document 1, for example).

PRIOR ART DOCUMENT

Patent Document

Patent Document 1: Japanese Patent Publication No. 2016-187990A

SUMMARY

Technical Problem

When the lamp device as described above is mounted on a vehicle body, it is necessary to adjust an attitude of the light source with respect to the vehicle body or a reference light-emitting direction of the light source. Similarly, it is necessary to adjust an attitude of the sensor with respect to the vehicle body or a reference sensing position of the sensor.

It is a first object of the presently disclosed subject matter to provide a configuration capable of efficiently adjusting a reference light-emitting direction of a light source and a reference sensing position of a sensor.

In order to downsize the lamp device, it is necessary to reduce the distance between the light source and the sensor. However, there would be a case where stray light generated by light emitted from the light source may be detected by the sensor, so that acquisition of desired information is hindered.

A second object of the presently disclosed subject matter is to downsize a lamp device while suppressing detection of stray light by a sensor.

Solution to Problem

In order to achieve the first object, a first illustrative aspect of the presently disclosed subject matter provides a lamp device adapted to be mounted on a vehicle, comprising:
  a light source;
  a first sensor configured to sense external information of the vehicle;
  a lamp housing that houses the light source;
  a first sensor housing that houses the first sensor; and
  a first supporting member that supports the lamp housing and the first sensor housing,
  wherein the lamp housing and the first sensor housing are arranged in a direction corresponding to a left-right direction of the vehicle when viewed from a direction corresponding to a front-rear direction of the vehicle; and
  wherein a maximum dimension of the lamp housing in a direction corresponding to an up-down direction of the vehicle is smaller than a maximum dimension of the first sensor housing in the same direction.

Generally, the accuracy required for adjusting the reference sensing position of the sensor is lower than the accuracy required for adjusting the reference light-emitting direction of the light source. In other words, in order to accurately adjust the reference light-emitting direction of the light source, it is preferable that the degree of freedom relating to the attitude change of the lamp housing is high.

In the first illustrative aspect, both the lamp housing and the first sensor housing arranged in the direction corresponding to the left-right direction of the vehicle are supported by the common first supporting member, thereby defining the positional relationship between the two housings. Moreover, the maximum dimension of the first sensor housing in the direction corresponding to the up-down direction of the vehicle is intentionally made larger than the maximum dimension of the lamp housing in the direction corresponding to the up-down direction of the vehicle. As a result, a space having a high degree of freedom for changing the attitude of the lamp housing can be secured on the left or right of the first sensor housing.

Accordingly, in a case where the reference light-emitting direction of the light source and the reference sensing position of the first sensor are configured to be individually adjustable, the degree of freedom in adjusting the reference light-emitting direction of the light source requiring higher accuracy can be increased although the positioning of the lamp housing and the positioning of the first sensor housing that are arranged in the left-right direction of the vehicle are kept easy. That is, it is possible to provide a configuration capable of efficiently adjusting the reference light-emitting direction of the light source and the reference sensing position of the first sensor.

In order to achieve the first object, a second illustrative aspect of the presently disclosed subject matter provides a lamp device adapted to be mounted on a vehicle, comprising:
  a light source;
  a first sensor configured to sense external information of the vehicle;
  a lamp housing that houses the light source;
  a first sensor housing that houses the first sensor; and
  a first supporting member that supports the lamp housing and the first sensor housing,
  wherein the lamp housing and the first sensor housing are arranged in a direction corresponding to a front-rear direction of the vehicle when viewed from a direction corresponding to a left-right direction of the vehicle; and
  wherein a maximum dimension of the lamp housing in a direction corresponding to an up-down direction of the vehicle is smaller than a maximum dimension of the first sensor housing in the same direction.

Generally, the accuracy required for adjusting the reference sensing position of the sensor is lower than the accuracy required for adjusting the reference light-emitting direction of the light source. In other words, in order to accurately adjust the reference light-emitting direction of the light source, it is preferable that the degree of freedom relating to the attitude change of the lamp housing is high.

In the second illustrative aspect, both the lamp housing and the first sensor housing arranged in the direction corresponding to the front-rear direction of the vehicle are supported by the common first supporting member, thereby defining the positional relationship between the two housings. Moreover, the maximum dimension of the first sensor housing in the direction corresponding to the up-down direction of the vehicle is intentionally made larger than the maximum dimension of the lamp housing in the direction corresponding to the up-down direction of the vehicle. As a result, a space having a high degree of freedom for changing the attitude of the lamp housing can be secured ahead of or behind the first sensor housing.

Accordingly, in a case where the reference light-emitting direction of the light source and the reference sensing position of the first sensor are configured to be individually adjustable, the degree of freedom in adjusting the reference light-emitting direction of the light source requiring higher accuracy can be increased although the positioning of the lamp housing and the positioning of the first sensor housing that are arranged in the front-rear direction of the vehicle are kept easy. That is, it is possible to provide a configuration capable of efficiently adjusting the reference light-emitting direction of the light source and the reference sensing position of the first sensor.

The lamp device according to the first or second illustrative aspect may further comprise:
  a second sensor configured to sense external information of the vehicle in a manner that is different from the first sensor; and
  a second sensor housing that houses the second sensor, wherein the lamp housing is located between the first sensor housing and the second sensor housing;
  wherein an upper end of the lamp housing is located below an upper end of the first sensor housing and an upper end of the second sensor housing; and
  wherein a lower end of the lamp housing is located above a lower end of the first sensor housing and a lower end of the second sensor housing.

According to such a configuration, a space having a high degree of freedom for changing the attitude of the lamp housing can be secured between the first sensor housing and the second sensor housing.

In this case, the second sensor housing may be supported by the first supporting member.

According to this configuration, since the lamp housing, the first sensor housing, and the second sensor housing are supported by the common first supporting member, positioning between the three housings can be facilitated.

The lamp device according to the first or second illustrative aspect may be configured such that a maximum dimension of the lamp housing in the direction corresponding to the left-right direction of the vehicle is larger than the maximum dimension thereof in the direction corresponding to the up-down direction of the vehicle.

According to such a configuration, it is possible to arrange a plurality of light sources at least in a direction corresponding to the left-right direction of the vehicle while utilizing a space formed by the first sensor housing that allows the attitude of the lamp housing to be changed. Therefore, it is possible to increase the amount of light emitted from the lamp housing while increasing the utilization efficiency of the space.

In order to achieve the first object, a third illustrative aspect of the presently disclosed subject matter provides a lamp device adapted to be mounted on a vehicle, comprising:
  a light source;
  a first sensor configured to sense external information of the vehicle;
  a lamp housing that houses the light source;
  a first sensor housing that houses the first sensor; and
  a first supporting member that supports the lamp housing and the first sensor housing,
  wherein the lamp housing and the first sensor housing are arranged in a direction corresponding to an up-down direction of the vehicle when viewed from a direction corresponding to a front-rear direction of the vehicle; and
  wherein a maximum dimension of the lamp housing in a direction corresponding to a left-right direction of the vehicle is smaller than a maximum dimension of the first sensor housing in the same direction.

Generally, the accuracy required for adjusting the reference sensing position of the sensor is lower than the accuracy required for adjusting the reference light-emitting direction of the light source. In other words, in order to accurately adjust the reference light-emitting direction of the light source, it is preferable that the degree of freedom relating to the attitude change of the lamp housing is high.

In the third illustrative aspect, both the lamp housing and the first sensor housing arranged in the direction corresponding to the up-down direction of the vehicle are supported by the common first supporting member, thereby defining the positional relationship between the two housings. Moreover, the maximum dimension of the first sensor housing in the direction corresponding to the left-right direction of the vehicle is intentionally made larger than the maximum dimension of the lamp housing in the direction corresponding to the left-right direction of the vehicle. As a result, a space having a high degree of freedom for changing the attitude of the lamp housing can be secured above or below the first sensor housing.

Accordingly, in a case where the reference light-emitting direction of the light source and the reference sensing position of the first sensor are configured to be individually adjustable, the degree of freedom in adjusting the reference light-emitting direction of the light source requiring higher accuracy can be increased although the positioning of the lamp housing and the positioning of the first sensor housing that are arranged in the up-down direction of the vehicle are kept easy. That is, it is possible to provide a configuration capable of efficiently adjusting the reference light-emitting direction of the light source and the reference sensing position of the first sensor.

In order to achieve the first object, a fourth illustrative aspect of the presently disclosed subject matter provides a lamp device adapted to be mounted on a vehicle, comprising:
  a light source;
  a first sensor configured to sense external information of the vehicle;
  a lamp housing that houses the light source;
  a first sensor housing that houses the first sensor; and
  a first supporting member that supports the lamp housing and the first sensor housing,
  wherein the lamp housing and the first sensor housing are arranged in a direction corresponding to a front-rear direction of the vehicle when viewed from a direction corresponding to an up-down direction of the vehicle; and
  wherein a maximum dimension of the lamp housing in a direction corresponding to a left-right direction of the vehicle is smaller than a maximum dimension of the first sensor housing in the same direction.

Generally, the accuracy required for adjusting the reference sensing position of the sensor is lower than the accuracy required for adjusting the reference light-emitting direction of the light source. In other words, in order to accurately adjust the reference light-emitting direction of the light source, it is preferable that the degree of freedom relating to the attitude change of the lamp housing is high.

In the fourth illustrative aspect, both the lamp housing and the first sensor housing arranged in the direction corresponding to the front-rear direction of the vehicle are supported by the common first supporting member, thereby defining the positional relationship between the two housings. Moreover, the maximum dimension of the first sensor housing in the direction corresponding to the left-right direction of the vehicle is intentionally made larger than the maximum dimension of the lamp housing in the direction corresponding to the left-right direction of the vehicle. As a result, a space having a high degree of freedom for changing the attitude of the lamp housing can be secured ahead of or behind the first sensor housing.

Accordingly, in a case where the reference light-emitting direction of the light source and the reference sensing position of the first sensor are configured to be individually adjustable, the degree of freedom in adjusting the reference light-emitting direction of the light source requiring higher accuracy can be increased although the positioning of the lamp housing and the positioning of the first sensor housing that are arranged in the front-rear direction of the vehicle are kept easy. That is, it is possible to provide a configuration capable of efficiently adjusting the reference light-emitting direction of the light source and the reference sensing position of the first sensor.

The lamp device according to the third or fourth illustrative aspect may further comprise:
 a second sensor configured to sense external information of the vehicle in a manner that is different from the first sensor; and
 a second sensor housing that houses the second sensor,
 wherein the lamp housing is located between the first sensor housing and the second sensor housing;
 wherein a left end of the lamp housing is located on the right of a left end of the first sensor housing and a left end of the second sensor housing; and
 wherein a right end of the lamp housing is located on the left of a right end of the first sensor housing and a right end of the second sensor housing.

According to such a configuration, a space having a high degree of freedom for changing the attitude of the lamp housing can be secured between the first sensor housing and the second sensor housing.

In this case, the second sensor housing may be supported by the first supporting member.

According to this configuration, since the lamp housing, the first sensor housing, and the second sensor housing are supported by the common first supporting member, positioning between the three housings can be facilitated.

The lamp device according to the third or fourth illustrative aspect may be configured such that a maximum dimension of the lamp housing in the direction corresponding to the up-down direction of the vehicle is larger than the maximum dimension thereof in the direction corresponding to the left-right direction of the vehicle.

According to such a configuration, it is possible to arrange a plurality of light sources at least in a direction corresponding to the up-down direction of the vehicle while utilizing a space formed by the first sensor housing that allows the attitude of the lamp housing to be changed. Therefore, it is possible to increase the amount of light emitted from the lamp housing while increasing the utilization efficiency of the space.

The lamp device according to each of the above illustrative aspects may further comprise a second supporting member that supports the first sensor housing with the first supporting member therebetween.

According to such a configuration, it is possible to improve the positioning accuracy of the first sensor housing. Accordingly, the positioning accuracy of the lamp housing supported via the common first supporting member can also be improved. As a result, it is possible to improve the adjustment accuracy of the reference light-emitting direction of the light source and the reference sensing position of the first sensor.

The lamp device according to each of the above illustrative aspects may be configured such that the first supporting member is a portion of a casing that encloses the lamp housing and the first sensor housing.

According to such a configuration, the lamp housing and the first sensor housing can be protected from interferences with external members during an operation for mounting the lamp device on the vehicle, for example. As a result, it is possible to improve the adjustment accuracy of the reference light-emitting direction of the light source and the reference sensing position of the first sensor.

In this case, the lamp device may be configured such that:
 the first sensor housing has a plurality of outer surfaces extending in intersecting directions; and
 an inner surface of the casing has a portion extending in the outer surfaces.

According to such a configuration, it is possible to further improve the positioning accuracy of the first sensor housing. Accordingly, the positioning accuracy of the lamp housing supported via the common first supporting member can also be improved. As a result, it is possible to improve the adjustment accuracy of the reference light-emitting direction of the light source and the reference sensing position of the first sensor.

The lamp device according to each of the above illustrative aspects may be configured such that:
 the first supporting member has a first engagement member extending in a direction corresponding to an inside-outside direction of the vehicle; and
 the first engagement member is configured to engage with a second engagement member that is provided on the vehicle.

According to such a configuration, the positioning accuracy of the lamp housing and the first sensor housing with respect to the vehicle can be improved. As a result, it is possible to improve the adjustment accuracy of the reference light-emitting direction of the light source and the reference sensing position of the first sensor.

In order to achieve the second object, a fifth illustrative aspect of the presently disclosed subject matter provides a lamp device adapted to be mounted on a vehicle, comprising:
 a light source;
 a first sensor configured to sense information of a first outside area of the vehicle;
 a second sensor configured to sense information of a second outside area of the vehicle in a manner that is different from the first sensor;
 a lamp housing that houses the light source;
 a first sensor housing that houses the first sensor;
 a second sensor housing that houses the second sensor; and
 a first supporting member that supports the lamp housing, the first sensor housing and the second sensor housing, wherein the lamp housing is located between the first sensor housing and the second sensor housing and in a side closer to an inside of the vehicle than the first outside area and the second outside area.

As a measure for suppressing the detection of stray light by the sensor, at least one of the sensor and the light source may be housed in the housing. However, the presence of the housing can be an obstacle to the downsizing of the lamp device. In addition, light reflected or scattered by the housing may be a new factor for generating stray light. The inventors have deliberately housed each of the light source, the first sensor, and the second sensor in individual housings, and considered the proper arrangement of the lamp housing, the first sensor housing, and the second sensor housing.

As a result of the consideration, the inventors have found that it is possible to suppress the incidence of stray light caused by reflections and scatters by the lamp housing on the first sensor and the second sensor by arranging the lamp housing on the side corresponding to the inside of the vehicle with respect to the first area and the second area.

When the distance between the sensors is shortened in order to downsize the lamp device, the sensing areas of the sensors approach or overlap to each other. This makes it easy to prevent a blind spot of the sensor from occurring around the vehicle. If the arrangement condition of the lamp housing is determined as described above, the lamp housing will not be located in the sensing area of each sensor.

That is, the distance between the three items can be minimized while employing a configuration in which the lamp housing, the first sensor housing, and the second sensor housing are individually provided. Therefore, it is possible to provide a compact lamp device while suppressing the detection of stray light by the first sensor and the second sensor.

In addition, since the lamp housing, the first sensor housing, and the second sensor housing are supported by the common first supporting member, positioning between the three housings can be facilitated.

The above lamp device may be configured such that:
the first sensor housing has a first sensing surface facing the first outside area;
second sensor housing has a second sensing surface facing the second outside area; and
the lamp housing is located in a side closer to the inside of the vehicle than an end of the first sensing surface that is closer to the second sensing surface and an end of the second sensing surface that is closer to the first sensing surface, when viewed from a direction corresponding to an up-down direction of the vehicle.

According to such a configuration, it is possible to effectively suppress the incidence of stray light caused by back reflection or back scattering by the lamp housing on the first sensing surface of the first sensor housing and the second sensing surface of the second sensor housing. Therefore, the detection of stray light by the first sensor and the second sensor can be further suppressed.

The above lamp device may be configured such that:
an upper end of the lamp housing is located below an upper end of the first sensor housing and an upper end of the second sensor housing; and
a lower end of the lamp housing is located above a lower end of the first sensor housing and a lower end of the second sensor housing.

According to such a configuration, a space having a high degree of freedom for changing the attitude of the lamp housing can be secured between the first sensor housing and the second sensor housing.

In this case, the above lamp device may be configured such that a maximum dimension of the lamp housing in a direction corresponding to the left-right direction of the vehicle is larger than the maximum dimension thereof in the direction corresponding to the up-down direction of the vehicle.

According to such a configuration, it is possible to arrange a plurality of light sources at least in a direction corresponding to the left-right direction of the vehicle while utilizing a space formed by the first sensor housing and the second sensor housing that allows the attitude of the lamp housing to be changed. Therefore, it is possible to increase the amount of light emitted from the lamp housing while increasing the utilization efficiency of the space.

The above lamp device may further comprise a second supporting member that supports the lamp housing, the first sensor housing and the second sensor housing with the first supporting member therebetween.

According to such a configuration, it is possible to improve the positioning accuracy of the first sensor housing and the second sensor housing. Accordingly, the positioning accuracy of the lamp housing supported via the common first supporting member can also be improved. As a result, it is possible to improve the adjustment accuracy of the reference light-emitting direction of the light source, the reference sensing position of the first sensor, and the reference sensing position of the second sensor.

The above lamp device may be configured such that the first supporting member is a portion of a casing that encloses the lamp housing, the first sensor housing and the second sensor housing.

According to such a configuration, the lamp housing, the first sensor housing, and the second sensor housing can be protected from interferences with external members during an operation for mounting the lamp device on the vehicle, for example. As a result, it is possible to improve the adjustment accuracy of the reference light-emitting direction of the light source, the reference sensing position of the first sensor, and the reference sensing position of the second sensor.

In this case, the above lamp device may be configured such that:
the first sensor housing has a plurality of first outer surfaces extending in intersecting directions;
the second sensor housing has a plurality of second outer surfaces extending in intersecting directions; and
an inner surface of the casing has a portion extending in the first outer surfaces and the second outer surfaces.

According to such a configuration, it is possible to further improve the positioning accuracy of the first sensor housing and the second sensor housing. Accordingly, the positioning accuracy of the lamp housing supported via the common first supporting member can also be improved. As a result, it is possible to improve the adjustment accuracy of the reference light-emitting direction of the light source, the reference sensing position of the first sensor, and the reference sensing position of the second sensor.

The above lamp device may be configured such that:
the first supporting member has a first engagement member extending in a direction corresponding to an inside-outside direction of the vehicle; and
the first engagement member is configured to engage with a second engagement member that is provided on the vehicle.

According to such a configuration, the positioning accuracy of the lamp housing, the first sensor housing, and the second sensor housing with respect to the vehicle can be improved. As a result, it is possible to improve the adjustment accuracy of the reference light-emitting direction of the light source, the reference sensing position of the first sensor, and the reference sensing position of the second sensor.

DESCRIPTION OF EMBODIMENTS

Figure 1:
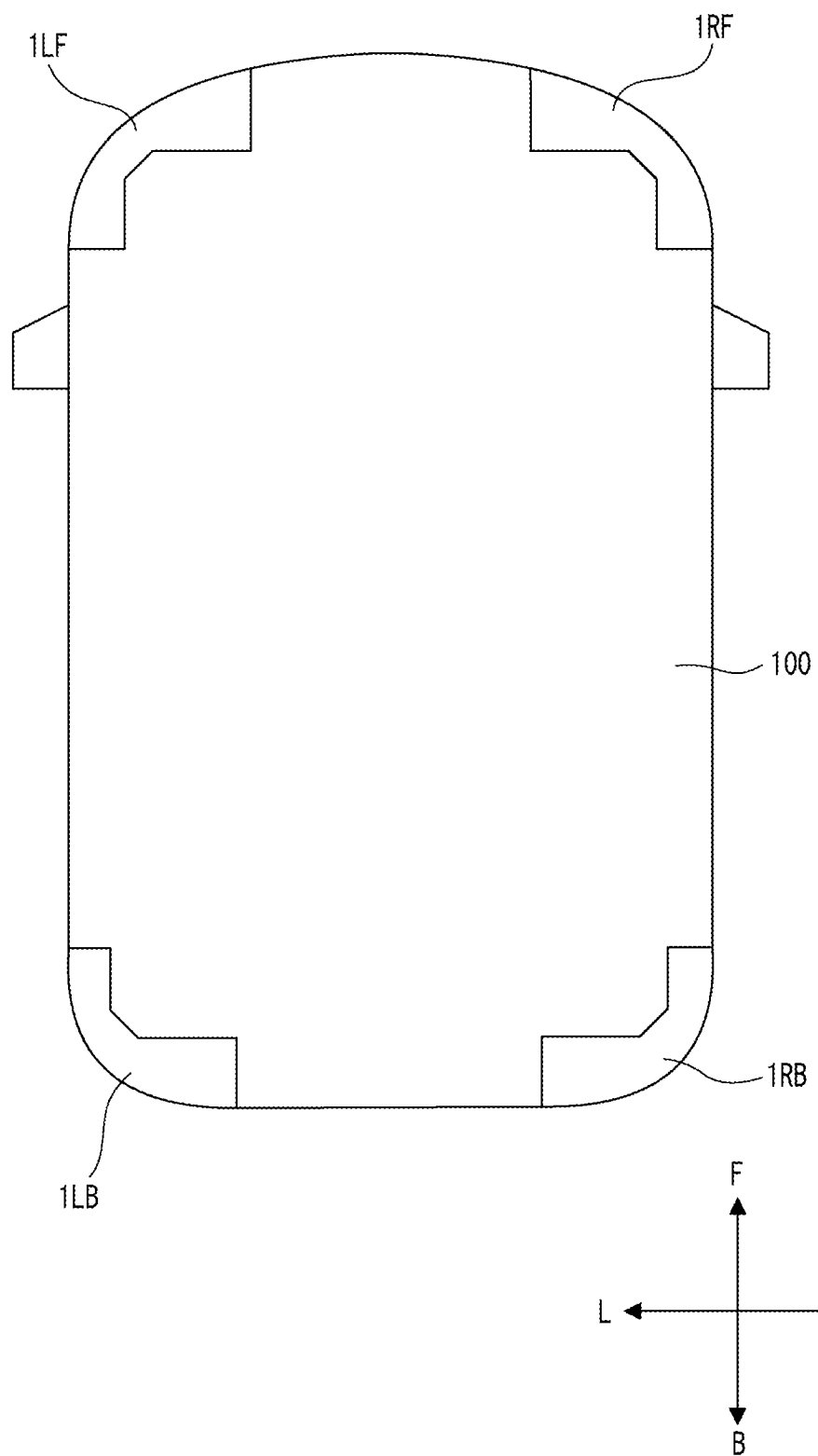
FIG. 1 illustrates locations in a vehicle on which lamp devices are to be mounted.

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms of "left" and "right" used in the following descriptions indicate the left-right directions as viewed from the driver's seat. In the accompanying drawings, the term "up-down direction" corresponds to the direction perpendicular to the drawing sheet.

As illustrated in FIG. 1, a left front lamp device 1LF according to a first embodiment is mounted on a left front corner portion of a vehicle 100. A right front lamp device 1RF according to the first embodiment is adapted to be mounted on a right front corner portion of the vehicle 100.

Figure 2:
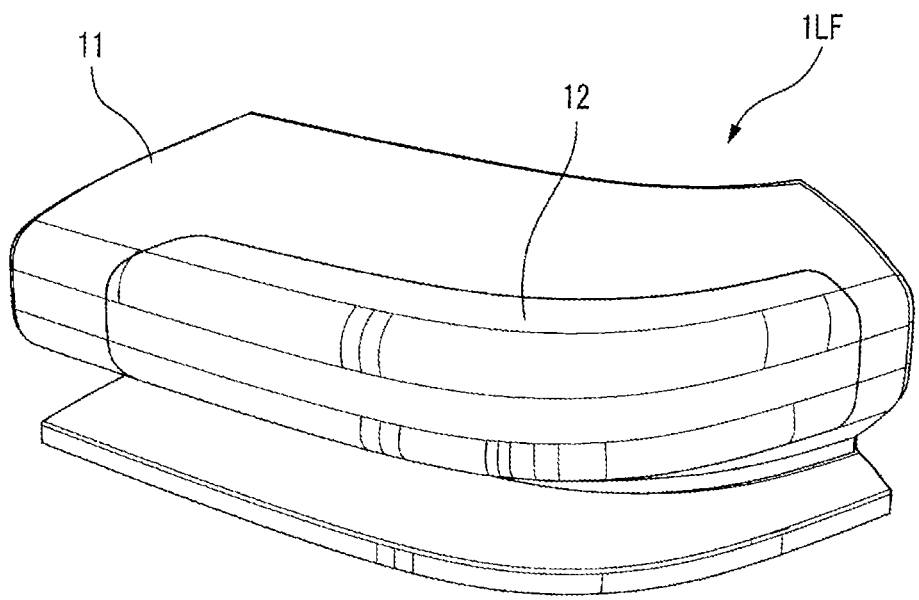
FIG. 2 illustrates an external appearance of a lamp device according to a first embodiment.

FIG. 2 illustrates an external appearance of the left front lamp device 1LF. Although not illustrated, the right front lamp device 1RF has a configuration symmetrical with the left front lamp device 1LF relative to a left-right direction of the vehicle 100.

Figure 3:
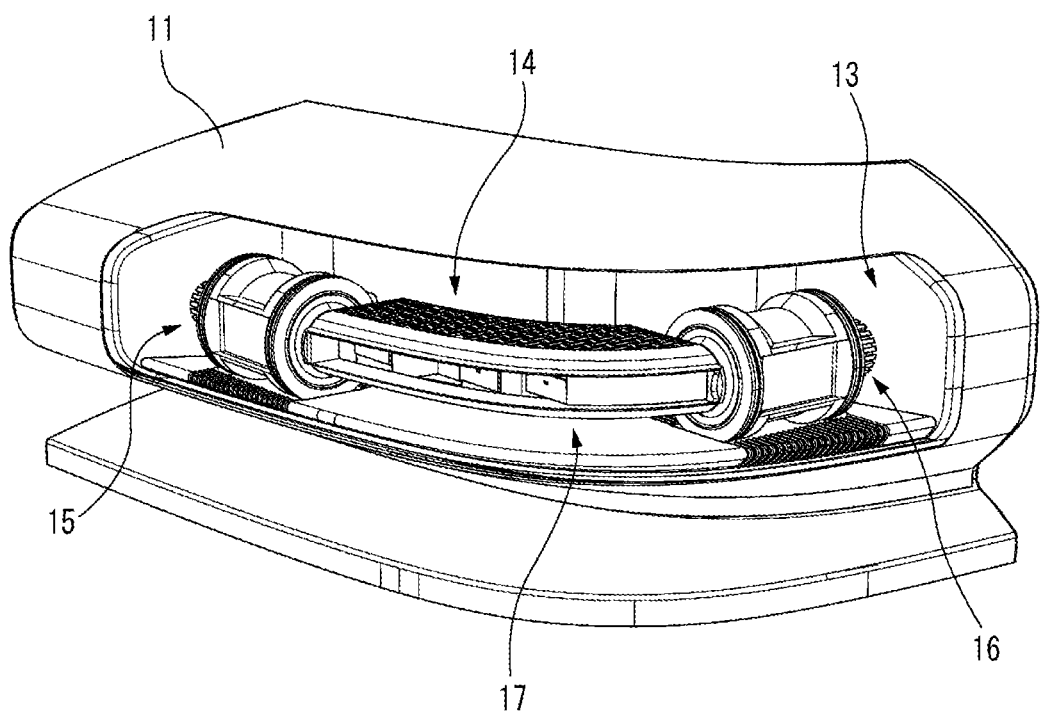
FIG. 3 illustrates a portion of the lamp device of FIG. 2.

The left front lamp device 1LF includes a housing 11 and a translucent cover 12. FIG. 3 illustrates a portion of the left front lamp device 1LF wherein the translucent cover 12 is removed from the state illustrated in FIG. 2. The housing 11 and the translucent cover 12 define a lamp chamber 13.

The left front lamp device 1LF includes a lamp unit 14, a front sensor unit 15, a side sensor unit 16, and a supporting unit 17. The lamp unit 14, the front sensor unit 15, the side sensor unit 16, and the supporting unit 17 are disposed in the lamp chamber 13.

Figure 4:
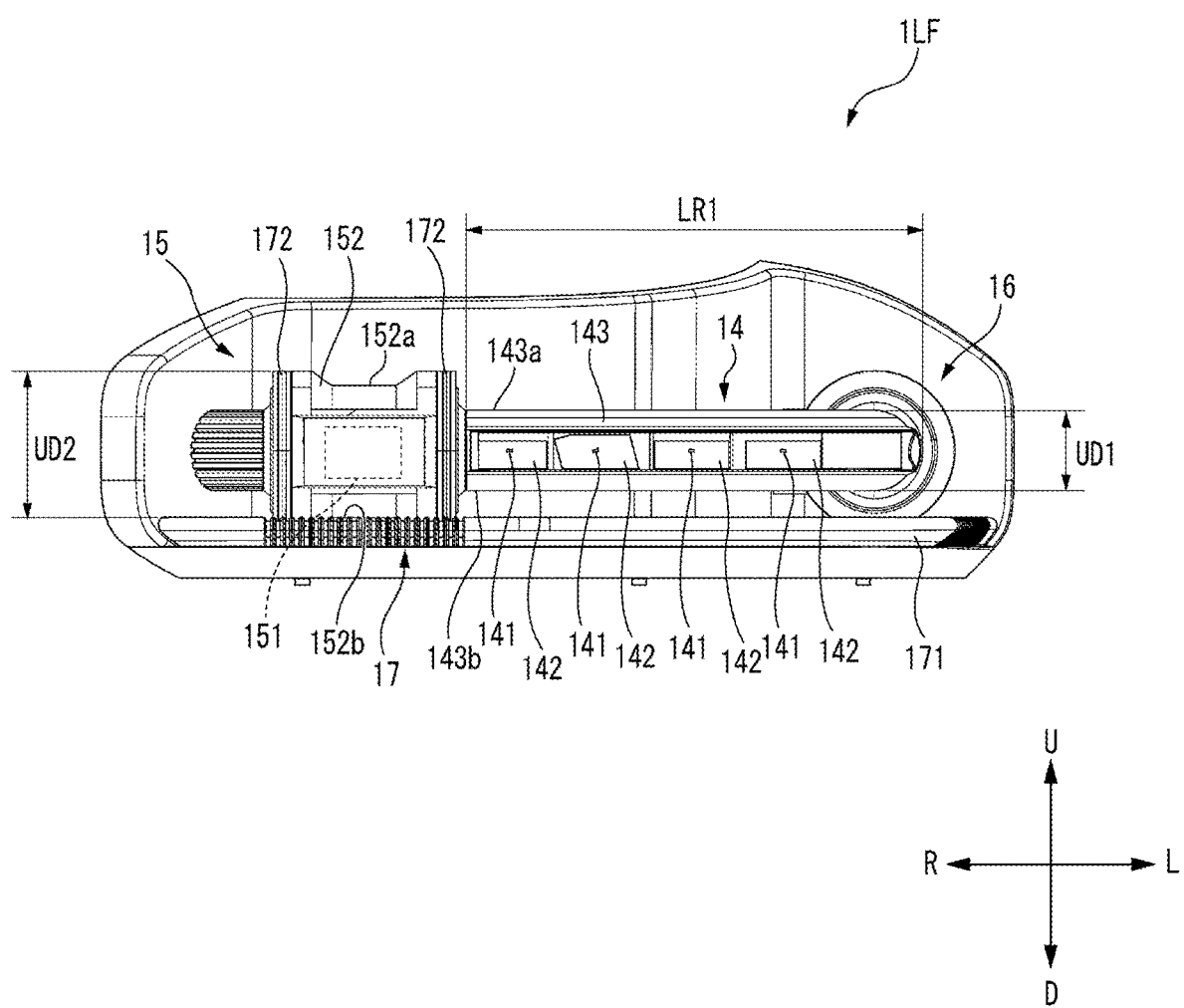
FIG. 4 illustrates a portion of the lamp device of FIG. 2.

FIG. 4 illustrates a front view of a portion of the left front lamp unit 1LF in the state illustrated in FIG. 3.

The lamp unit 14 includes a light source 141. As the light source 141, a lamp light source or a light emitting element can be used. Examples of lamp light sources include incandescent lamps, halogen lamps, discharge lamps, neon lamps, and the like. Examples of the light emitting element include a light emitting diode, a laser diode, and an organic EL element. In this embodiment, four light sources 141 are provided. However, the number of the light sources 141 may be appropriately determined according to the specifications of the left front lamp device 1LF.

The lamp unit 14 includes a reflector 142. The reflector 142 is configured to reflect the light emitted from the light source in a predetermined direction. In the present embodiment, one reflector 142 is provided for each of the four light sources 141. However, the relation between the number of the light sources 141 and the number of the reflectors 142 may be appropriately determined according to the specifications of the left front lamp device 1LF.

The lamp unit 14 includes a lamp housing 143. The lamp housing 143 houses the light sources 141 and the reflectors 142.

The front sensor unit 15 includes a front LiDAR sensor 151 (an example of the first sensor). The front LiDAR sensor 151 has a configuration for emitting non-visible light and a configuration for sensing returned light as a result of the non-visible light being reflected by an object that is present at least ahead of the vehicle 100 (one example of the outside of the vehicle). The front LiDAR sensor 151 may include a scan mechanism that changes the emission direction (i.e., the sensing direction) as required to sweep the non-visible light. In the present embodiment, infrared light having a wavelength of 905 nm is used as the non-visible light.

The front LiDAR sensor 151 can obtain the distance to the object associated with the returned light, for example, based on the time period from the time when the non-visible light is emitted in a certain direction to the time when the returned light is sensed. Further, by accumulating such distance data in association with the sensing position, it is possible to acquire information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface.

That is, the front LiDAR sensor 151 is a sensor that senses information of at least an area ahead of the vehicle 100. The front LiDAR sensor 151 outputs signals corresponding to sensed attributes of the returned light (intensity, wavelength, etc.). The above-mentioned information is acquired by appropriately processing the signals outputted from the front LiDAR sensor 151 by an information processing section (not illustrated). The information processing section may be provided in the left front lamp device 1LF or may be mounted on the vehicle 100.

The front sensor unit 15 includes a front sensor housing 152 (an example of the first sensor housing). The front sensor housing 152 houses the front LiDAR sensor 151.

The supporting unit 17 includes a base portion 171 and a pair of front supporting walls 172. The base portion 171 is disposed below the lamp housing 143 and the front sensor housing 152. The pair of front supporting walls 172 are fixed to the base portion 171.

The front sensor housing 152 is supported between the pair of front supporting walls 172. The lamp housing 143 is supported by one of the pair of front supporting walls 172. That is, the supporting unit 17 supports the lamp housing 143 and the front sensor housing 152.

The lamp housing 143 and the front sensor housing 152 are arranged in a direction corresponding to the left-right direction of the vehicle 100 when viewed from the front of the vehicle 100 (an example of the direction corresponding to the front-rear direction of the vehicle).

The maximum dimension UD1 of the lamp housing 143 in the direction corresponding to an up-down direction of the vehicle 100 is smaller than the maximum dimension UD2 of the front sensor housing 152 in the direction corresponding to the up-down direction of the vehicle 100.

Figure 5:
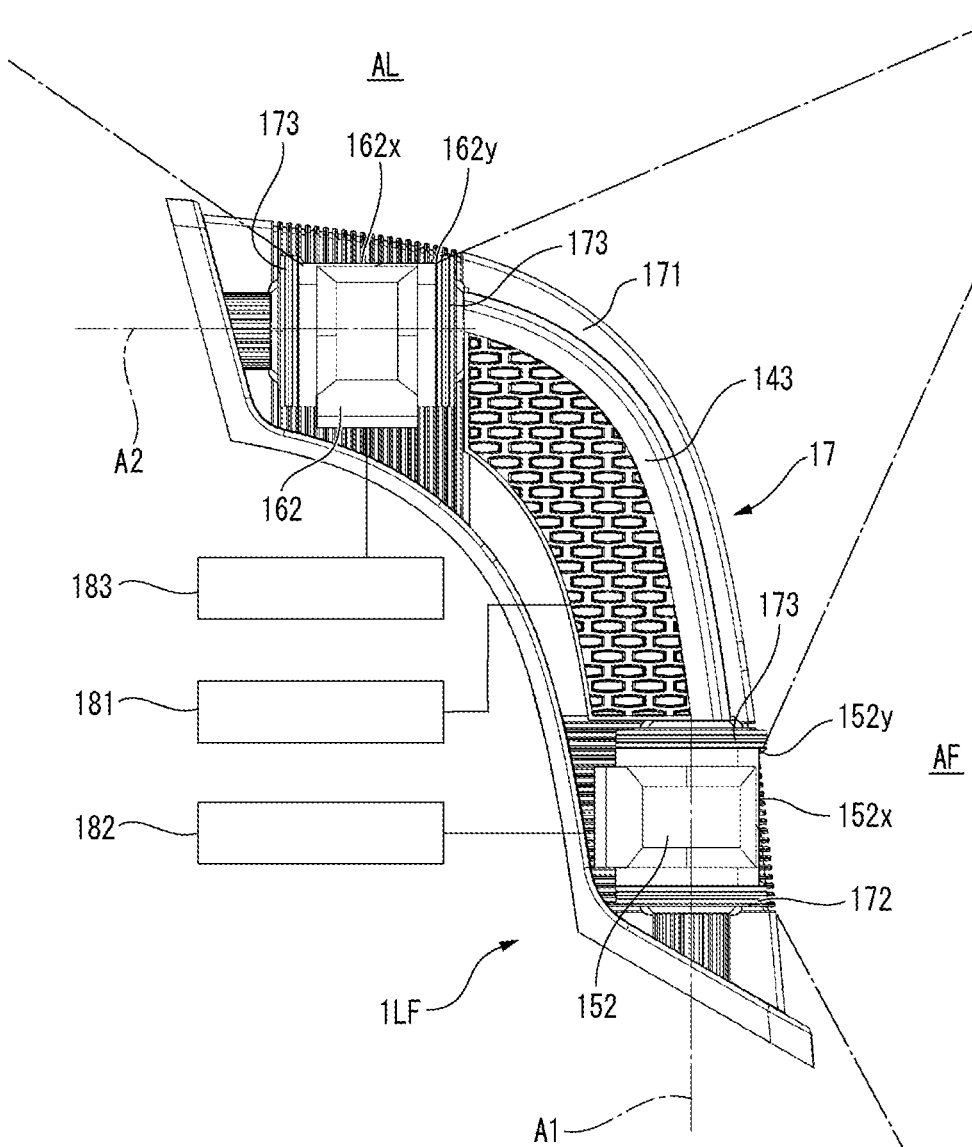
FIG. 5 illustrates a portion of the lamp device of FIG. 2.

According to such a configuration, a reference light-emitting direction of the light source 141 and a reference sensing position of the front LiDAR sensor 151 can be efficiently adjusted. The reason will be explained with reference to FIG. 5. FIG. 5 illustrates an external appearance of a portion of the left front lamp device 1LF as seen from the upper side of the vehicle 100.

The left front lamp device 1LF includes a lamp adjustment section 181. The lamp adjustment section 181 includes a screw mechanism or an actuator mechanism capable of changing the attitude of the lamp housing 143. The lamp adjustment section 181 can adjust the reference light-emitting direction of the light source 141 by changing the attitude of the lamp housing 143.

The left front lamp device 1LF includes a front sensor adjustment section 182. The front sensor adjustment section 182 includes a screw mechanism or an actuator mechanism capable of changing the attitude of the front sensor housing 152. The front sensor adjustment section 182 can adjust the reference sensing position of the front LiDAR sensor 151 by changing the attitude of the front sensor housing 152.

Specifically, the front sensor housing 152 is supported by a pair of front supporting walls 172 so as to be pivotable about a pivot axis A1 extending in the left-right direction of the vehicle 100. When the front sensor housing 152 is pivoted by the front sensor adjustment section 182, the reference sensing position of the front LiDAR sensor 151 is adjusted.

Generally, the accuracy required for adjusting the reference sensing position of the front LiDAR sensor 151 is lower than the accuracy required for adjusting the reference light-emitting direction of the light source 141. In other words, in order to accurately adjust the reference light-emitting direction of the light source 141, it is preferable that the degree of freedom as for the attitude change of the lamp housing 143 is high.

In the present embodiment, both the lamp housing 143 and the front sensor housing 152 arranged in the direction corresponding to the left-right direction of the vehicle are supported by the common supporting unit 17, thereby defining the positional relationship between the two housings. Moreover, the maximum dimension UD2 of the front sensor housing 152 in the direction corresponding to the up-down direction of the vehicle 100 is intentionally made larger than the maximum dimension UD1 of the lamp housing 143 in the direction corresponding to the up-down direction of the vehicle 100. As a result, a space having a high degree of freedom for changing the attitude of the lamp housing 143 can be secured on the left of the front sensor housing 152.

Accordingly, in a case where the reference light-emitting direction of the light source 141 and the reference sensing position of the front LiDAR sensor 151 are configured to be individually adjustable, the degree of freedom in adjusting the reference light-emitting direction of the light source 141 requiring higher accuracy can be increased although the positioning of the lamp housing 143 and the positioning of the front sensor housing 152 are kept easy. That is, it is possible to provide a configuration capable of efficiently adjusting the reference light-emitting direction of the light source 141 and the reference sensing position of the front LiDAR sensor 151.

Figure 6:
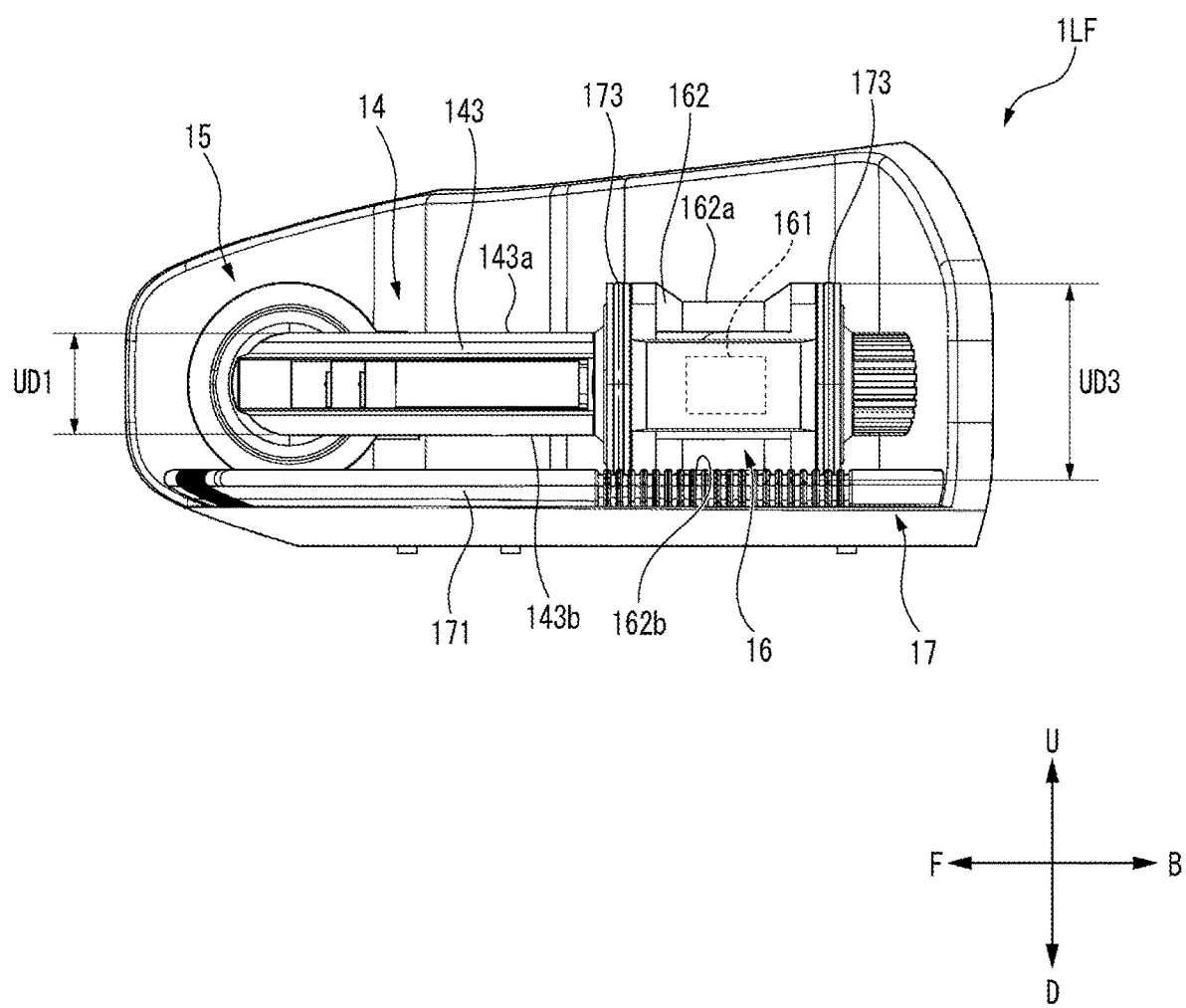
FIG. 6 illustrates a portion of the lamp device of FIG. 2.

FIG. 6 illustrates an external appearance of a portion of the left front lamp device 1LF illustrated in FIG. 3 as seen from the left side of the vehicle 100.

The side sensor unit 16 includes a side LiDAR sensor 161 (an example of the first sensor). The side LiDAR sensor 161 has a configuration for emitting non-visible light and a configuration for sensing returned light as a result of the non-visible light being reflected by an object that is present at least on the left of the vehicle 100 (one example of the outside of the vehicle). The side LiDAR sensor 161 may include a scan mechanism that changes the emission direction (i.e., the sensing direction) as required to sweep the non-visible light. In the present embodiment, infrared light having a wavelength of 905 nm is used as the non-visible light.

The side LiDAR sensor 161 can acquire the distance to the object associated with the returned light, for example, based on the time period from the time when the non-visible light is emitted in a certain direction to the time when the returned light is sensed. Further, by accumulating such distance data in association with the sensing position, it is possible to acquire information as to the shape of the object associated with the returned light. Additionally or alternatively, information as to an attribute such as the material of the object associated with the returned light can be obtained based on the difference in wavelength between the emitted light and the returned light. Additionally or alternatively, information about the color of the object, such as a white line on the road surface, can be obtained, for example, based on the difference in reflectivity of the returned light from the road surface.

That is, the side LiDAR sensor 161 is a sensor that senses information of at least an area on the left of the vehicle 100. The side LiDAR sensor 161 outputs signals corresponding to sensed attributes of the returned light (intensity, wavelength, etc.). The above-mentioned information is acquired by appropriately processing the signals outputted from the side LiDAR sensor 161 by an information processing section (not illustrated). The information processing section may be provided in the left front lamp device 1LF or may be mounted on the vehicle 100.

The side sensor unit 16 includes a side sensor housing 162 (an example of the first sensor housing). The side sensor housing 162 houses the side LiDAR sensor 161.

The supporting unit 17 (an example of the first supporting member) includes a base portion 171 and a pair of side supporting walls 173. The base portion 171 is disposed below the lamp housing 143 and the side sensor housing 162. The pair of side supporting walls 173 are fixed to the base portion 171.

The side sensor housing 162 is supported between the pair of side supporting walls 173. The lamp housing 143 is supported by one of the pair of side supporting walls 173. That is, the supporting unit 17 supports the lamp housing 143 and the side sensor housing 162.

The lamp housing 143 and the side sensor housing 162 are arranged in a direction corresponding to the front-rear direction of the vehicle 100 when viewed from the left side of the vehicle 100 (an example of the direction corresponding to the left-right direction of the vehicle).

The maximum dimension UD1 of the lamp housing 143 in the direction corresponding to the up-down direction of the vehicle 100 is smaller than the maximum dimension UD3 of the side sensor housing 162 in the direction corresponding to the up-down direction of the vehicle 100.

According to such a configuration, the reference light-emitting direction of the light source 141 and the reference sensing position of the side LiDAR sensor 161 can be efficiently adjusted. The reason will be explained with reference to FIG. 5.

As illustrated in FIG. 5, the left front lamp device 1LF includes a side sensor adjustment section 183. The side sensor adjustment section 183 includes a screw mechanism or an actuator mechanism that can change the attitude of the side sensor housing 162. The side sensor adjustment section 183 can adjust the reference sensing position of the side LiDAR sensor 161 by changing the attitude of the side sensor housing 162.

Specifically, the side sensor housing 162 is supported by the pair of side supporting walls 173 so as to be pivotable about a pivot axis A2 extending in the front-rear direction of the vehicle 100. When the side sensor housing 162 is pivoted by the side sensor adjustment section 183, the reference sensing position of the side LiDAR sensor 161 is adjusted.

Generally, the accuracy required for adjusting the reference sensing position of the side LiDAR sensor 161 is lower than the accuracy required for adjusting the reference light-emitting direction of the light source 141. In other words, in order to accurately adjust the reference light-emitting direction of the light source 141, it is preferable that the degree of freedom as for the attitude change of the lamp housing 143 is high.

In the present embodiment, both the lamp housing 143 and the side sensor housing 162 arranged in the direction corresponding to the front-rear direction of the vehicle are supported by the common supporting unit 17, thereby defining the positional relationship between the two housings. Then, the maximum dimension UD3 of the side sensor housing 162 in the direction corresponding to the up-down direction of the vehicle 100 is intentionally made larger than the maximum dimension UD1 of the lamp housing 143 in the direction corresponding to the up-down direction of the vehicle 100. As a result, a space having a high degree of freedom for changing the attitude of the lamp housing 143 can be secured ahead of the side sensor housing 162.

Accordingly, in a case where the reference light-emitting direction of the light source 141 and the reference sensing position of the side LiDAR sensor 161 are configured to be individually adjustable, the degree of freedom in adjusting the reference light-emitting direction of the light source 141 requiring higher accuracy can be increased although the positioning of the lamp housing 143 and the positioning of the side sensor housing 162 are kept easy. That is, it is possible to provide a configuration capable of efficiently adjusting the reference light-emitting direction of the light source 141 and the reference sensing position of the side LiDAR sensor 161.

The left front lamp device 1LF according to the present embodiment includes the front LiDAR sensor 151 and the side LiDAR sensor 161. However, a configuration in which either one of the front LiDAR sensor 151 and the side LiDAR sensor 161 is provided can also be adopted.

In the case where both the front LiDAR sensor 151 and the side LiDAR sensor 161 are provided, the front LiDAR sensor 151 (an example of the first sensor) and the side LiDAR sensor 161 (an example of the second sensor) can be regarded as sensors for sensing external information of the vehicle 100 in different manners. That is, the definition of "sensing external information of the vehicle in different manners" can comprehend not only a case where the types of sensors are different, but also a case where the types of sensors are the same but the detection directions are different.

In this case, as illustrated in FIGS. 3 to 6, the lamp housing 143 is located between the front sensor housing 152 (an example of the first sensor housing) and the side sensor housing 162 (an example of the second sensor housing). An upper end 143a of the lamp housing 143 is located below an upper end 152a of the front sensor housing 152 and an upper end 162a of the side sensor housing 162. A lower end 143b of the lamp housing 143 is located above a lower end 152b of the front sensor housing 152 and a lower end 162b of the side sensor housing 162.

According to such a configuration, a space with a high degree of freedom for changing the attitude of the lamp housing 143 can be secured between the front sensor housing 152 and the side sensor housing 162.

Specifically, as illustrated in FIG. 5, the front sensor housing 152 has a sensing surface 152x (an example of the first sensing surface). The sensing surface 152x faces a forward area AF of the vehicle 100 (an example of the first outside area of the vehicle) from which information is acquired by the front LiDAR sensor 151.

On the other hand, the side sensor housing 162 has a sensing surface 162x (an example of the second sensing surface). The sensing surface 162x faces a left area AL of the vehicle 100 (an example of the second outside area of the vehicle) from which information is acquired by the side LiDAR sensor 161.

The lamp housing 143 is located between the front sensor housing 152 and the side sensor housing 162 on a side corresponding to the inside of the vehicle 100 with respect to the front area AF and the left area AL.

Here, the expression "the inside of the vehicle 100" means the rear as seen from the front side of the vehicle 100, the front as seen from the rear side of the vehicle 100, the right as seen from the left side of the vehicle 100, and the left as seen from the right side of the vehicle 100. In the case as illustrated in FIG. 5, the lamp housing 143 is disposed on the side corresponding to the rear in the front-rear direction of the vehicle 100 with respect to the front area AF, and on the side corresponding to the right in the left-right direction of the vehicle 100 with respect to the left area AL.

As a measure for suppressing the detection of stray light by the sensor, at least one of the sensor and the light source may be housed in the housing. However, the presence of the housing can be an obstacle to the downsizing of the lamp device. In addition, light reflected or scattered by the housing may be a new factor for generating stray light. The inventors have deliberately housed each of the light source 141, the front LiDAR sensor 151, and the side LiDAR sensor 161 in individual housings, and considered the proper arrangement of the lamp housing 143, the front sensor housing 152, and the side sensor housing 162.

As a result of the consideration, the inventors have found that it is possible to suppress the incidence of stray light caused by reflections and scatters by the lamp housing 143 on the front LiDAR sensor 151 and the side LiDAR sensor 161 by arranging the lamp housing 143 on the side corresponding to the inside of the vehicle 100 with respect to the front area AF and the left area AL.

When the distance between the sensors is shortened in order to downsize the lamp device, the sensing areas of the sensors approach or overlap to each other. This makes it easy to prevent a blind spot of the sensor from occurring around the vehicle. If the arrangement condition of the lamp housing 143 is determined as described above, the lamp housing 143 will not be located in the sensing area of each sensor.

That is, the distance between the three items can be minimized while employing a configuration in which the lamp housing 143, the front sensor housing 152, and the side sensor housing 162 are individually provided. Therefore, it is possible to provide a compact left front lamp device 1LF while suppressing the detection of stray light by the front LiDAR sensor 151 and the side LiDAR sensor 161.

In addition, since the lamp housing 143, the front sensor housing 152, and the side sensor housing 162 are supported by the common supporting unit 17, positioning between the three housings can be facilitated.

More specifically, when viewed from the up-down direction of the vehicle 100, the lamp housing 143 is located on the side corresponding to the inside of the vehicle 100 (i.e., the rear side in the front-rear direction of the vehicle 100) than an end portion 152y of the sensing surface 152x of the front sensor housing 152 on the side closer to the sensing surface 162x of the side sensor housing 162. In addition, the lamp housing 143 is located on the side corresponding to the inside of the vehicle 100 (i.e., the right side in the left-right direction of the vehicle 100) with respect to an end portion 162y of the sensing surface 162x of the side sensor housing 162 on the side closer to the sensing surface 152x of the front sensor housing 152.

According to such a configuration, it is possible to effectively suppress the incidence of stray light caused by back reflection or back scattering by the lamp housing 143 on the sensing surface 152x of the front sensor housing 152 and the sensing surface 162x of the side sensor housing 162. Therefore, it is possible to further suppress the detection of stray light by the front LiDAR sensor 151 and the detection of stray light by the side LiDAR sensor 161.

As illustrated in FIGS. 4 and 6, the upper end 143a of the lamp housing 143 is located below the upper end 152a of the front sensor housing 152 and the upper end 162a of the side sensor housing 162. The lower end 143b of the lamp housing 143 is located above the lower end 152b of the front sensor housing 152 and the lower end 162b of the side sensor housing 162.

According to such a configuration, a space with a high degree of freedom for changing the attitude of the lamp housing 143 by the lamp adjustment section 181 can be secured between the front sensor housing 152 and the side sensor housing 162.

The sensors housed in the front sensor housing 152 and the side sensor housing 162 need not be of the same type. The sensors may be appropriately selected from LiDAR sensors, ultrasonic sensors, millimeter wave radars, cameras, and the like.

In the present embodiment, as illustrated in FIG. 4, the maximum dimension LR1 of the lamp housing 143 in the direction corresponding to the left-right direction of the vehicle 100 is larger than the maximum dimension UD1 in the direction corresponding to the up-down direction of the vehicle 100.

According to such a configuration, a plurality of light sources 141 can be arranged at least in a direction corresponding to the left-right direction of the vehicle 100 while utilizing a space formed by at least one of the front sensor housing 152 and the side sensor housing 162 that allows the attitude of the lamp housing 143 to be changed. Therefore, it is possible to increase the amount of light emitted from the lamp housing 143 while increasing the utilization efficiency of the space.

In the present embodiment, the light emitted from the light source 141 passes through the translucent cover 12 attached to the housing 11. However, in addition to or instead of the translucent cover 12, a translucent cover through which the light emitted from the light source 141 passes may be attached to the lamp housing 143. The translucent cover may have a lens function. In this case, it is possible to cause the lamp housing 143 to emit light whose traveling direction is more appropriately controlled, and it is possible to further suppress the detection of stray light by the front LiDAR sensor 151 and the side LiDAR sensor 161.

In this case, the maximum dimension of the translucent cover in the direction corresponding to the left-right direction of the vehicle 100 is larger than the maximum dimension in the direction corresponding to the up-down direction of the vehicle 100. The maximum dimension of the light translucent cover in the direction corresponding to the up-down direction of the vehicle 100 is smaller than the maximum dimensions of the front sensor housing 152 and the side sensor housing 162 in the same direction.

Further, when viewed from the up-down direction of the vehicle 100, the translucent cover is located on the side corresponding to the inside of the vehicle 100 (i.e., the rear side in the front-rear direction of the vehicle 100) with respect to the end portion 152y of the sensing surface 152x of the front sensor housing 152 on the side closer to the sensing surface 162x of the side sensor housing 162. In addition, the translucent cover is located on the side corresponding to the inside of the vehicle 100 (i.e., the right side in the left-right direction of the vehicle 100) with respect to the end portion 162y of the sensing surface 162x of the side sensor housing 162 on the side closer to the sensing surface 152x of the front sensor housing 152.

In the present embodiment, the left front lamp device 1LF and the right front lamp device 1RF are exemplified as the lamp device. However, the configuration described referring to the left front lamp device 1LF is also applicable to a left rear lamp device 1LB to be disposed in a left rear corner portion of the vehicle 100 illustrated in FIG. 1 and a right rear lamp device 1RB to be disposed in a right rear corner portion of the vehicle 100. For example, the left rear lamp device 1LB may have a symmetrical configuration with the left front lamp device 1LF relative to the front-rear direction of the vehicle 100. The right rear lamp unit 1RB may have a symmetrical configuration with the left rear lamp device 1LB relative to the left-right direction of the vehicle 100.

Next, referring to FIGS. 7 to 9, a left rear lamp device 2LB and a right rear lamp device 2RB according to a second embodiment will be described. As for the elements having substantially the same configurations as those in the left front lamp device 1LF and the right front lamp device 1RF according to the first embodiment, illustrations and repetitive explanations will be omitted. The left rear lamp device 2LB is configured to be arranged in the left rear corner portion of the vehicle 100, similarly to the left rear lamp device 1LB illustrated in FIG. 1. The right rear lamp device 2RB is configured to be arranged in the right rear corner portion of the vehicle 100, similarly to the right rear lamp device 1RB illustrated in FIG. 1.

Figure 7:
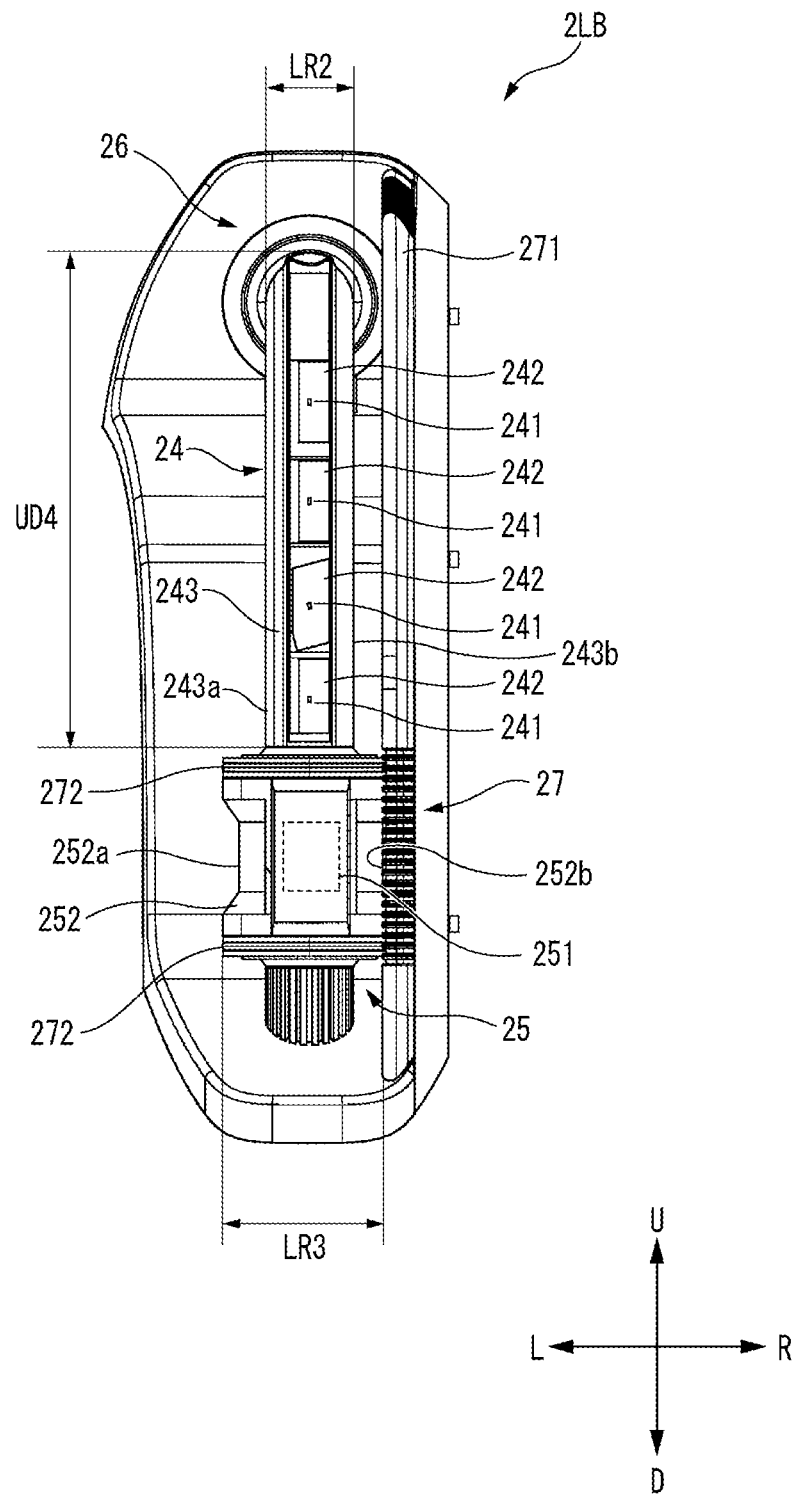
FIG. 7 illustrates a portion of a lamp device according to a second embodiment.

FIG. 7 corresponds to FIG. 4, and illustrates an external appearance of a portion of the left rear lamp device 2LB as seen from the rear side of the vehicle. Although not illustrated, the right rear lamp device 2RB has a configuration symmetrical with the left rear lamp device 2LB relative to the left-right direction of the vehicle 100.

The left-rear lamp device 2LB includes a lamp unit 24, a rear sensor unit 25, a side sensor unit 26, and a supporting unit 27.

The lamp unit 24 includes a light source 241. As the light source 241, a lamp light source or a light emitting element can be used. Examples of lamp light sources include incandescent lamps, halogen lamps, discharge lamps, neon lamps, and the like. Examples of the light emitting element include a light emitting diode, a laser diode, and an organic EL element. In this embodiment, four light sources 241 are provided. However, the number of the light sources 241 may be appropriately determined according to the specifications of the left rear lamp device 2LB.

The lamp unit 24 includes a reflector 242. The reflector 242 is configured to reflect the light emitted from the light source in a predetermined direction. In the present embodiment, one reflector 242 is provided for each of the four light sources 241. However, the relation between the number of light sources 241 and the number of reflectors 242 can be appropriately determined according to the specifications of the left-rear lamp device 2LB.

The lamp unit 24 includes a lamp housing 243. The lamp housing 243 houses the light source 241 and the reflector 242.

The rear sensor unit 25 includes a rear LiDAR sensor 251 (an example of the first sensor). Since the configuration and the function of the rear LiDAR sensor 251 are substantially the same as those of the front LiDAR sensor 151 according to the first embodiment, a repetitive explanation will be omitted.

That is, the rear LiDAR sensor 251 is a sensor for sensing information of at least an area behind the vehicle 100 (an example of the outside of the vehicle). The rear LiDAR sensor 251 outputs signals corresponding to sensed attributes of the returned light (intensity, wavelength, etc.). The above-mentioned information is acquired by appropriately processing the signals outputted from the rear LiDAR sensor 251 by an information processing section (not illustrated). The information processing section may be provided in the left-rear lamp device 2LB or may be mounted on the vehicle 100.

The rear sensor unit 25 includes a rear sensor housing 252 (an example of the first sensor housing). The rear sensor housing 252 houses the rear LiDAR sensor 251.

The supporting unit 27 (one example of the first supporting member) includes a base portion 271 and a pair of rear supporting walls 272. The base portion 271 is disposed on the right of the lamp housing 243 and the rear sensor housing 252. The pair of rear supporting walls 272 are fixed to the base portion 271.

The rear sensor housing 252 is supported between the pair of rear supporting walls 272. The lamp housing 243 is supported by one of the pair of rear supporting walls 272. That is, the supporting unit 27 supports the lamp housing 243 and the rear sensor housing 252.

The lamp housing 243 and the front sensor housing 252 are arranged in a direction corresponding to the up-down direction of the vehicle 100 when viewed from the rear of the vehicle 100 (an example of the direction corresponding to the front-rear direction of the vehicle).

The maximum dimension LR2 of the lamp housing 243 in the direction corresponding to the left-right direction of the vehicle 100 is smaller than the maximum dimension LR3 of the rear sensor housing 252 in the direction corresponding to the left-right direction of the vehicle 100.

According to such a configuration, the reference light-emitting direction of the light source 241 and the reference sensing position of the rear LiDAR sensor 251 can be efficiently adjusted. The reason will be described with reference to FIG. 8. FIG. 8 illustrates an external appearance of a portion of the left rear lamp unit 2LB as seen from the left side of the vehicle 100.

The left-rear lamp device 2LB includes a lamp adjustment section 281. The lamp adjustment section 281 includes a screw mechanism or an actuator mechanism that can change the attitude of the lamp housing 243. The lamp adjustment section 281 can adjust the reference light-emitting direction of the light source 241 by changing the attitude of the lamp housing 243.

The left rear lamp device 2LB includes a rear sensor adjustment section 282. The rear sensor adjustment section 282 includes a screw mechanism or an actuator mechanism that can change the attitude of the rear sensor housing 252. The rear sensor adjustment section 282 can adjust the reference sensing position of the rear LiDAR sensor 251 by changing the attitude of the rear sensor housing 252.

Specifically, the rear sensor housing 252 is supported by the pair of rear supporting walls 272 so as to be pivotable about a pivot axis A3 extending in the up-down direction of the vehicle 100. When the rear sensor housing 252 is pivoted by the rear sensor adjustment section 282, the reference sensing position of the rear LiDAR sensor 251 is adjusted.

Generally, the accuracy required for adjusting the reference sensing position of the rear LiDAR sensor 251 is lower than the accuracy required for adjusting the reference light-emitting direction of the light source 241. In other words, in order to accurately adjust the reference light-emitting direction of the light source 241, it is preferable that the degree of freedom relating to the attitude change of the lamp housing 243 is high.

In the present embodiment, both the lamp housing 243 and the rear sensor housing 252 arranged in the direction corresponding to the up-down direction of the vehicle are supported by the common supporting unit 27, thereby defining the positional relationship between the two housings. Moreover, the maximum dimension LR3 of the rear sensor housing 252 in the direction corresponding to the left-right direction of the vehicle 100 is intentionally made larger than the maximum dimension LR2 of the lamp housing 243 in the direction corresponding to the left-right direction of the vehicle 100. As a result, a space having a high degree of freedom for changing the attitude of the lamp housing 243 can be secured above the rear sensor housing 252.

Accordingly, in a case where the reference light-emitting direction of the light source 241 and the reference sensing position of the rear LiDAR sensor 251 are configured to be individually adjustable, the degree of freedom in adjusting the reference light-emitting direction of the light source 241 requiring higher accuracy can be increased although the positioning of the lamp housing 243 and the positioning of the rear sensor housing 252 are kept easy. That is, it is possible to provide a configuration capable of efficiently adjusting the reference light-emitting direction of the light source 241 and the reference sensing position of the rear LiDAR sensor 251.

Figure 8:
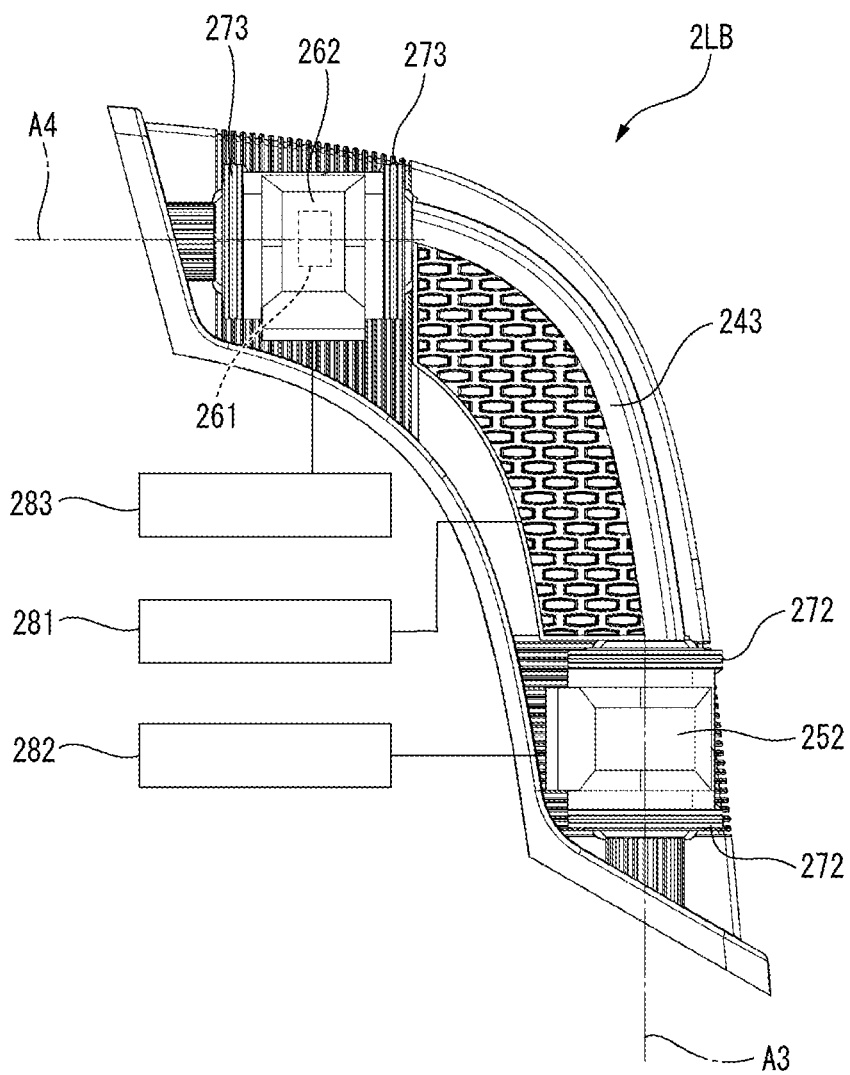
FIG. 8 illustrates a portion of the lamp device of FIG. 7.
Figure 8:
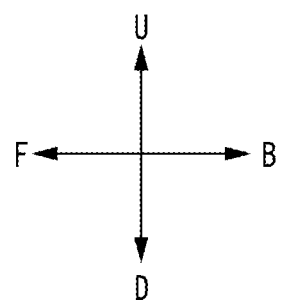

As illustrated in FIG. 8, the side sensor unit 26 includes a side LiDAR sensor 261 (one example of the first sensor). Since the side LiDAR sensor 261 has substantially the same configuration and function as the side LiDAR sensor 161 according to the first embodiment, repetitive explanations thereof will be omitted.

That is, the side LiDAR sensor 261 is a sensor for sensing information of at least an area on the left the vehicle 100 (an example of the outside of the vehicle). The side LiDAR sensor 261 outputs signals corresponding to sensed attributes of the returned light (intensity, wavelength, etc.). The above-mentioned information is acquired by appropriately processing the signals outputted from the side LiDAR sensor 261 by an information processing section (not illustrated). The information processing section may be provided in the left-rear lamp device 2LB or may be mounted on the vehicle 100.

Figure 9:
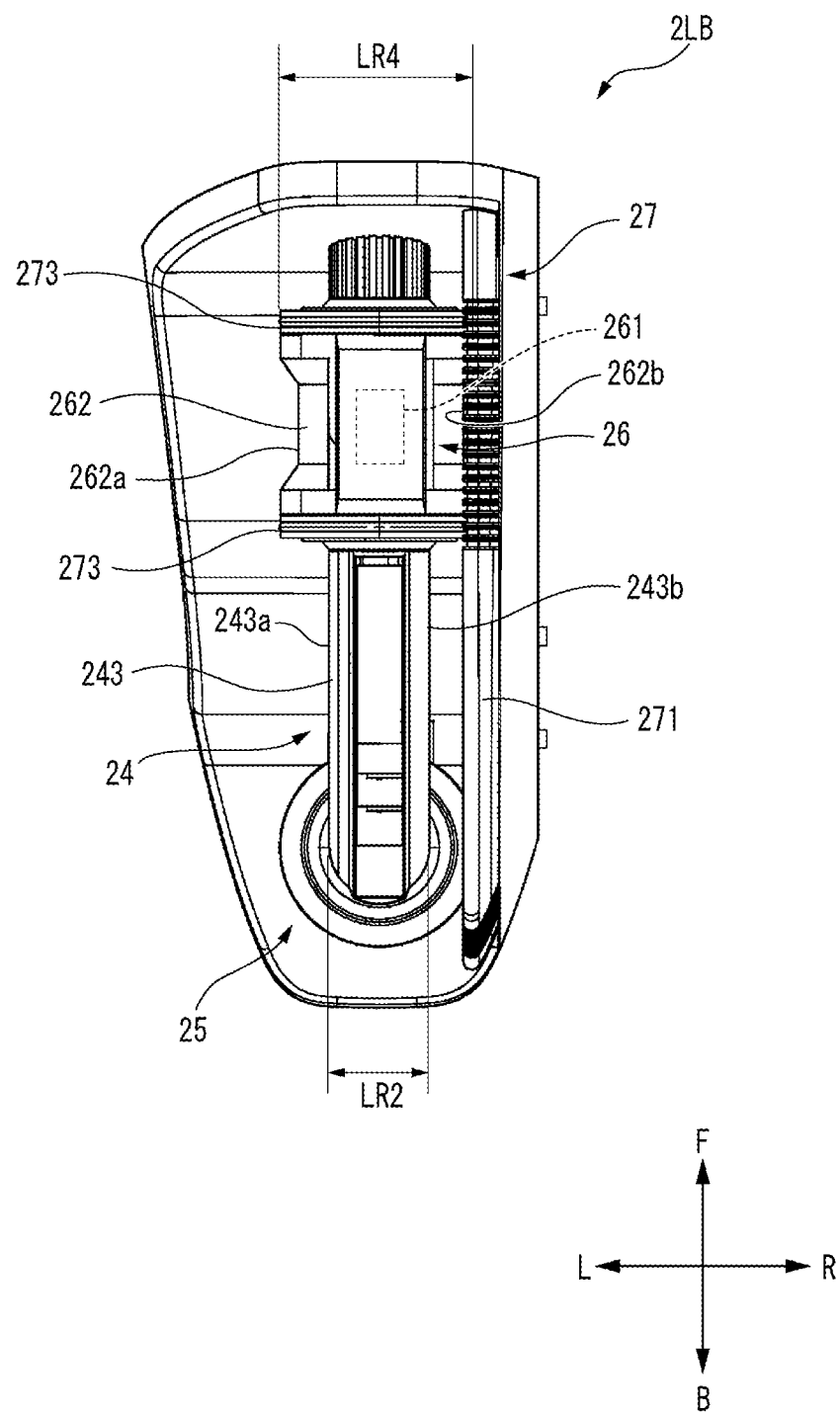
FIG. 9 illustrates a portion of the lamp device of FIG. 7.

FIG. 9 illustrates an external appearance of a portion of the left rear lamp device 2LB as seen from the upper side of the vehicle 100. The side sensor unit 26 includes a side sensor housing 262 (an example of the first sensor housing). The side sensor housing 262 houses the side LiDAR sensor 261.

The supporting unit 27 (an example of the first supporting member) includes a base portion 271 and a pair of side supporting walls 273. The base portion 271 is disposed on the right of the lamp housing 243 and the side sensor housing 262. The pair of side supporting walls 273 are fixed to the base portion 271.

The side sensor housing 262 is supported between the pair of side supporting walls 273. The lamp housing 243 is supported by one of the pair of side supporting walls 273. That is, the supporting unit 27 supports the lamp housing 243 and the side sensor housing 262.

The lamp housing 243 and the front sensor housing 252 are arranged in a direction corresponding to the front-rear direction of the vehicle 100 when viewed from the above of the vehicle 100 (an example of the direction corresponding to the up-down direction of the vehicle).

The maximum dimension LR2 of the lamp housing 243 in the direction corresponding to the left-right direction of the vehicle 100 is smaller than the maximum dimension LR4 of the side sensor housing 262 in the direction corresponding to the left-right direction of the vehicle 100.

According to such a configuration, the reference light-emitting direction of the light source 241 and the reference sensing position of the side LiDAR sensor 261 can be efficiently adjusted. The reason will be described with reference to FIG. 8.

As illustrated in FIG. 8, the left rear lamp device 2LB includes a side sensor adjustment section 283. The side sensor adjustment section 283 includes a screw mechanism or an actuator mechanism capable of changing the attitude of the side sensor housing 262. The side sensor adjustment section 283 can adjust the reference sensing position of the side LiDAR sensor 261 by changing the attitude of the side sensor housing 262.

Specifically, the side sensor housing 262 is supported by the pair of side supporting walls 273 so as to be pivotable about a pivot axis A4 extending in the front-rear direction of the vehicle 100. As the side sensor housing 262 is pivoted by the side sensor adjustment section 283, the reference sensing position of the side LiDAR sensor 261 is adjusted.

Generally, the accuracy required for adjusting the reference sensing position of the side LiDAR sensor 261 is lower than the accuracy required for adjusting the reference light-emitting direction of the light source 241. In other words, in order to accurately adjust the reference light-emitting direction of the light source 241, it is preferable that the degree of freedom relating to the attitude change of the lamp housing 243 is high.

In the present embodiment, both the lamp housing 243 and the side sensor housing 262 arranged in the direction corresponding to the front-rear direction of the vehicle are supported by the common supporting unit 27, thereby defining the positional relationship between the two housings. Moreover, the maximum dimension LR4 of the side sensor housing 262 in the direction corresponding to the left-right direction of the vehicle 100 is intentionally made larger than the maximum dimension LR2 of the lamp housing 243 in the direction corresponding to the left-right direction of the vehicle 100. As a result, a space having a high degree of freedom for changing the attitude of the lamp housing 243 can be secured behind the side sensor housing 262.

Accordingly, in a case where the reference light-emitting direction of the light source 241 and the reference sensing position of the side LiDAR sensor 261 are configured to be individually adjustable, the degree of freedom in adjusting the reference light-emitting direction of the light source 241 requiring higher accuracy can be increased although the positioning of the lamp housing 243 and the positioning of the side sensor housing 262 are kept easy. That is, it is possible to provide a configuration capable of efficiently adjusting the reference light-emitting direction of the light source 241 and the reference sensing position of the side LiDAR sensor 261.

The left-rear lamp device 2LB according to the present embodiment includes the rear LiDAR sensor 251 and the side LiDAR sensor 261. However, a configuration in which either one of the rear LiDAR sensor 251 and the side LiDAR sensor 261 is provided can also be adopted.

In the case where both the rear LiDAR sensor 251 and the side LiDAR sensor 261 are provided, the rear LiDAR sensor 251 (an example of the first sensor) and the side LiDAR sensor 261 (an example of the second sensor) can be regarded as sensors for sensing external information of the vehicle 100 in different manners.

In this case, as illustrated in FIGS. 7 to 9, the lamp housing 243 is located between the rear sensor housing 252 and the side sensor housing 262. A left end 243a of the lamp housing 243 is positioned on the right of a left end 252a of the rear sensor housing 252 and a left end 262a of the side sensor housing 262. A right end 243b of the lamp housing 243 is located on the left of a right end 252b of the rear sensor housing 252 and a right end 262b of the side sensor housing 262.

According to such a configuration, a space with a high degree of freedom for changing the attitude of the lamp housing 243 can be secured between the rear sensor housing 252 and the side sensor housing 262.

In addition, since the lamp housing 243, the rear sensor housing 252, and the side sensor housing 262 are supported by the common supporting unit 27, positioning between the three housings can be facilitated.

The sensors housed in the rear sensor housing 252 and the side sensor housing 262 need not be of the same type. The sensors may be appropriately selected from LiDAR sensors, ultrasonic sensors, millimeter wave radars, cameras, and the like.

In the present embodiment, as illustrated in FIG. 7, the maximum dimension UD4 of the lamp housing 243 in the direction corresponding to the up-down direction of the vehicle 100 is larger than the maximum dimension LR2 in the direction corresponding to the horizontal direction of the vehicle 100.

According to such a configuration, a plurality of light sources 241 can be arranged at least in a direction corresponding to the up-down direction of the vehicle 100 while utilizing a space formed by at least one of the rear sensor housing 252 and the side sensor housing 262 that allows the attitude of the lamp housing 243 to be changed. Therefore, it is possible to increase the amount of light emitted from the lamp housing 243 while increasing the utilization efficiency of the space.

In addition to or instead of the translucent cover 12 attached to the housing 11 described with reference to FIG. 2, a translucent cover through which the light emitted from the light source 241 passes may be attached to the lamp housing 243. In this case, the maximum dimension of the light translucent cover in the direction corresponding to the up-down direction of the vehicle 100 is larger than the maximum dimension of the direction corresponding to the left-right direction of the vehicle 100. The translucent cover may have a lens function.

In this case, the maximum dimension of the light translucent cover in the direction corresponding to the up-down direction of the vehicle 100 is larger than the maximum dimension of the direction corresponding to the left-right direction of the vehicle 100. The maximum dimension of the translucent cover in the direction corresponding to the left-right direction of the vehicle 100 is smaller than the maximum dimensions of the rear sensor housing 252 and the side sensor housing 262 in the same direction.

Next, referring to FIGS. 10 to 12, a left front lamp device 3LF and a right front lamp device 3RF according to a third embodiment will be described. The left front lamp device 3LF is adapted to be mounted on the left front corner portion of the vehicle 100 in the same manner as the left front lamp device 1LF illustrated in FIG. 1. The right front lamp device 3RF is adapted to be mounted on the right front corner portion of the vehicle 100 in the same manner as the right front lamp device 1RF illustrated in FIG. 1.

Figure 10:
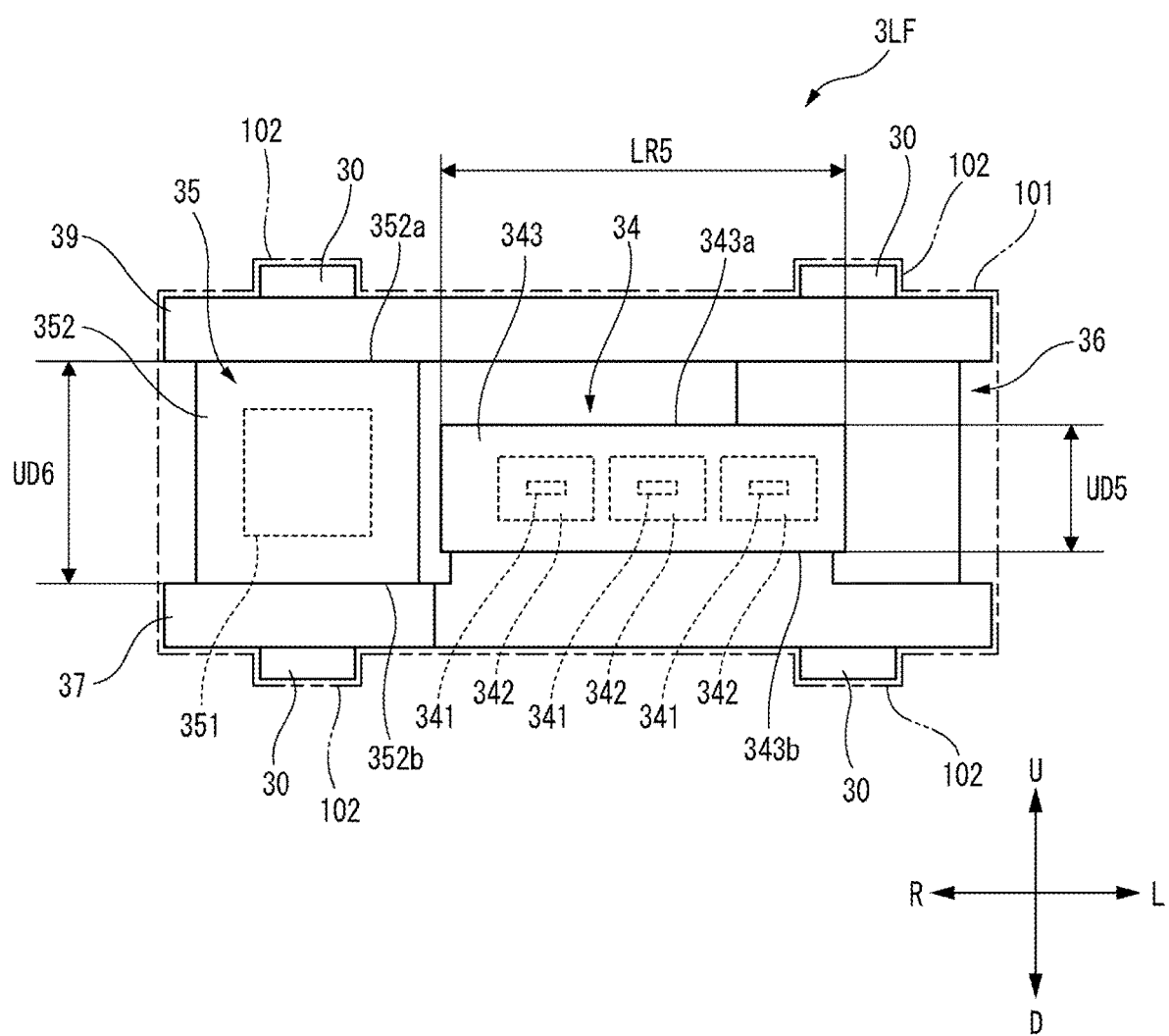
FIG. 10 illustrates a configuration of a lamp device according to a third embodiment.

FIG. 10 illustrates an external appearance of the left front lamp device 3LF as seen from the front side of the vehicle 100. Although not illustrated, the right front lamp device 3RF has a configuration symmetrical with the left front lamp device 3LF relative to the left-right direction of the vehicle 100.

The left front lamp device 3LF includes a lamp unit 34, a front sensor unit 35, a side sensor unit 36, and a lower supporting member 37.

The lamp unit 34 includes a light source 341. As the light source 341, a lamp light source or a light emitting element can be used. Examples of lamp light sources include incandescent lamps, halogen lamps, discharge lamps, neon lamps, and the like. Examples of the light emitting element include a light emitting diode, a laser diode, and an organic EL element. In this embodiment, three light sources 341 are provided. However, the number of the light sources 341 may be appropriately determined according to the specifications of the left front lamp unit 3LF.

The lamp unit 34 includes a reflector 342. The reflector 342 is configured to reflect the light emitted from the light source in a predetermined direction. In the present embodiment, one reflector 342 is provided for each of the three light sources 341. However, the relation between the number of the light sources 341 and the number of the reflectors 342 can be appropriately determined according to the specifications of the left front lamp device 3LF.

The lamp unit 34 includes a lamp housing 343. The lamp housing 343 houses the light source 341 and the reflector 342.

The front sensor unit 35 includes a front LiDAR sensor 351 (one example of the first sensor). Since the configuration and the function of the front LiDAR sensor 351 are substantially the same as those of the front LiDAR sensor 151 according to the first embodiment, repetitive explanations thereof will be omitted.

That is, the front LiDAR sensor 351 is a sensor for sensing information of at least an area ahead of the vehicle 100 (an example of the outside of the vehicle). The front LiDAR sensor 351 outputs signals corresponding to sensed attributes of the returned light (intensity, wavelength, etc.). The above-mentioned information is acquired by appropriately processing the signals outputted from the front LiDAR sensor 351 by an information processing section (not illustrated). The information processing section may be provided in the left front lamp device 3LF or may be mounted on the vehicle 100.

The front sensor unit 35 includes a front sensor housing 352 (an example of the first sensor housing). The front sensor housing 352 houses the front LiDAR sensor 351.

The lower supporting member 37 (an example of the first supporting member) is disposed below the lamp housing 343 and the front sensor housing 352. The lower supporting member 37 supports the lamp housing 343 and the front sensor housing 352. The front sensor housing 352 is fixed to the lower supporting member 37.

The lamp housing 343 and the front sensor housing 352 are arranged in a direction corresponding to the left-right direction of the vehicle 100 when viewed from the front of the vehicle 100 (an example of the direction corresponding to the front-rear direction of the vehicle).

The maximum dimension UD5 of the lamp housing 343 in the direction corresponding to the up-down direction of the vehicle 100 is smaller than the maximum dimension UD6 of the front sensor housing 352 in the direction corresponding to the up-down direction of the vehicle 100.

According to such a configuration, the reference light-emitting direction of the light source 341 and the reference sensing position of the front LiDAR sensor 351 can be efficiently adjusted. The reason will be described with reference to FIG. 11. FIG. 11 illustrates an external appearance of the left front lamp device 3LF as seen from the lower side of the vehicle 100.

The left front lamp device 3LF includes a lamp adjustment section 381. The lamp adjustment section 381 includes a screw mechanism or an actuator mechanism that can change the attitude of the lamp housing 343. The lamp adjustment section 381 can adjust the reference light-emitting direction of the light source 341 by changing the attitude of the lamp housing 343.

The left front lamp device 3LF includes a front sensor adjustment section 382. The front sensor adjustment section 382 includes a screw mechanism or an actuator mechanism that can change at least one of the position and the attitude of the front LiDAR sensor 351 housed in the front sensor housing 352 fixed to the lower supporting member 37. The front sensor adjustment section 382 can adjust the reference sensing position of the front LiDAR sensor 351 by changing at least one of the position and the attitude of the front LiDAR sensor 351.

Alternatively, the front LiDAR sensor 351 may be immovable relative to the front sensor housing 352, i.e., the lower supporting member 37. In this case, instead of adjusting the reference sensing position of the front LiDAR sensor 351, the front sensor adjustment section 382 may be configured to correct the signals outputted from the front LiDAR sensor 351 so as to obtain a result equivalent to the case where the reference sensing position is adjusted.

Generally, the accuracy required for adjusting the reference sensing position of the front LiDAR sensor 351 is lower than the accuracy required for adjusting the reference light-emitting direction of the light source 341. In other words, in order to accurately adjust the reference light-emitting direction of the light source 341, it is preferable that the degree of freedom relating to the attitude change of the lamp housing 343 is high.

In the present embodiment, both the lamp housing 343 and the front sensor housing 352 arranged in the direction corresponding to the left-right direction of the vehicle are supported by the common lower supporting member 37, thereby defining the positional relationship between the two housings. Moreover, the maximum dimension UD6 of the front sensor housing 352 in the direction corresponding to the up-down direction of the vehicle 100 is intentionally made larger than the maximum dimension UD5 of the lamp housing 343 in the direction corresponding to the up-down direction of the vehicle 100. As a result, a space having a high degree of freedom for changing the attitude of the lamp housing 343 can be secured on the left of the front sensor housing 352.

Accordingly, in a case where the reference light-emitting direction of the light source 341 and the reference sensing position of the front LiDAR sensor 351 are configured to be individually adjustable, the degree of freedom in adjusting the reference light-emitting direction of the light source 341 requiring higher accuracy can be increased although the positioning of the lamp housing 343 and the positioning of the front sensor housing 352 are kept easy. That is, it is possible to provide a configuration capable of efficiently adjusting the reference light-emitting direction of the light source 341 and the reference sensing position of the front LiDAR sensor 351.

Figure 12:
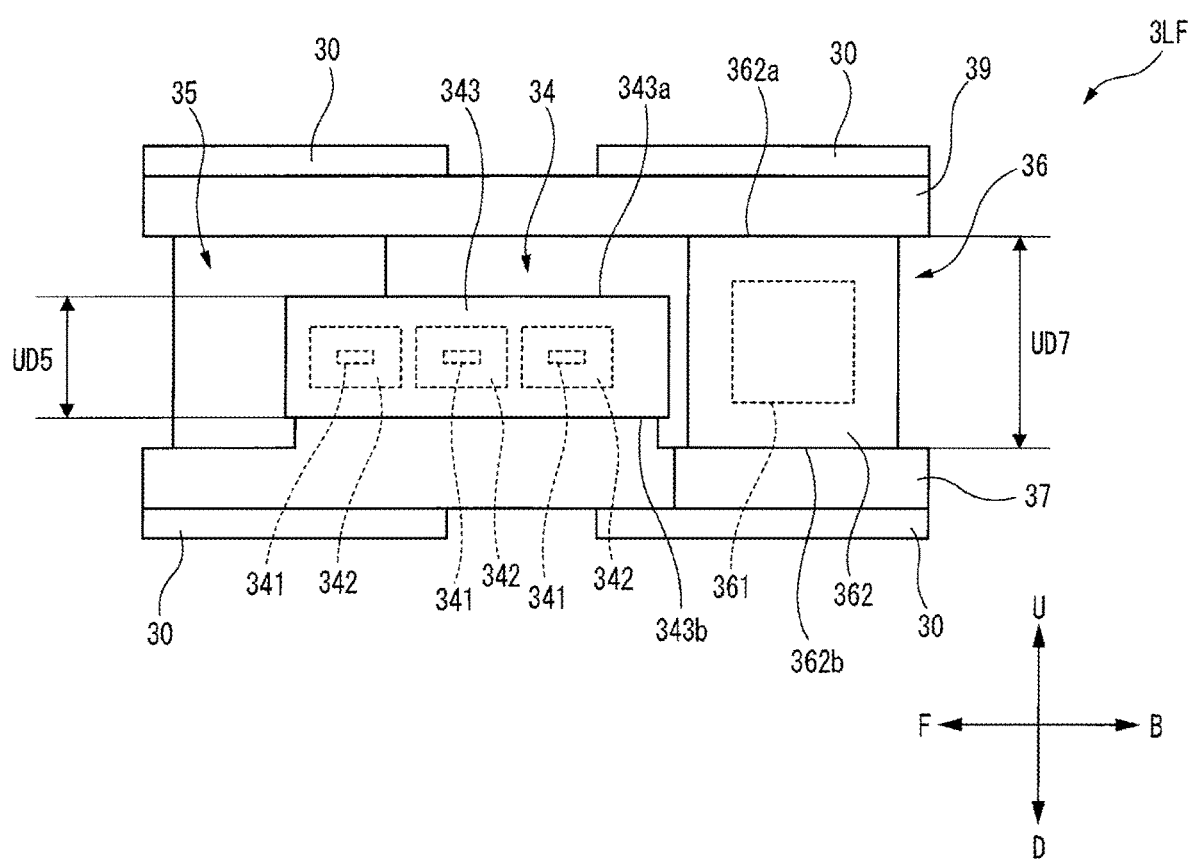
FIG. 12 illustrates a portion of the lamp device of FIG. 10.

FIG. 12 illustrates an external appearance of a portion of the left front lamp device 3LF as seen from the left side of the vehicle 100.

The side sensor unit 36 includes a side LiDAR sensor 361 (one example of the first sensor). Since the configuration and the function of the side LiDAR sensor 361 are substantially the same as those of the side LiDAR sensor 161 according to the first embodiment, repetitive explanations thereof will be omitted.

That is, the side LiDAR sensor 361 is a sensor for sensing information of at least an area on the left the vehicle 100 (an example of the outside of the vehicle). The side LiDAR sensor 361 outputs signals corresponding to sensed attributes of the returned light (intensity, wavelength, etc.). The above-mentioned information is acquired by appropriately processing the signals outputted from the side LiDAR sensor 361 by an information processing section (not illustrated). The information processing section may be provided in the left front lamp device 3LF or may be mounted on the vehicle 100.

The side sensor unit 36 includes a side sensor housing 362 (an example of the first sensor housing). The side sensor housing 362 houses the side LiDAR sensor 361.

The lower supporting member 37 (an example of the first supporting member) is disposed below the lamp housing 343 and the side sensor housing 362. The lower supporting member 37 supports the lamp housing 343 and the side sensor housing 362. The side sensor housing 362 is fixed to the lower supporting member 37.

The lamp housing 343 and the side sensor housing 362 are arranged in a direction corresponding to the front-rear direction of the vehicle 100 when viewed from the left side of the vehicle 100 (an example of the direction corresponding to the left-right direction of the vehicle).

The maximum dimension UD5 of the lamp housing 343 in the direction corresponding to the up-down direction of the vehicle 100 is smaller than the maximum dimension UD7 of the side sensor housing 362 in the direction corresponding to the up-down direction of the vehicle 100.

According to such a configuration, the reference light-emitting direction of the light source 341 and the reference sensing position of the side LiDAR sensor 361 can be efficiently adjusted. The reason will be described with reference to FIG. 11.

Figure 11:
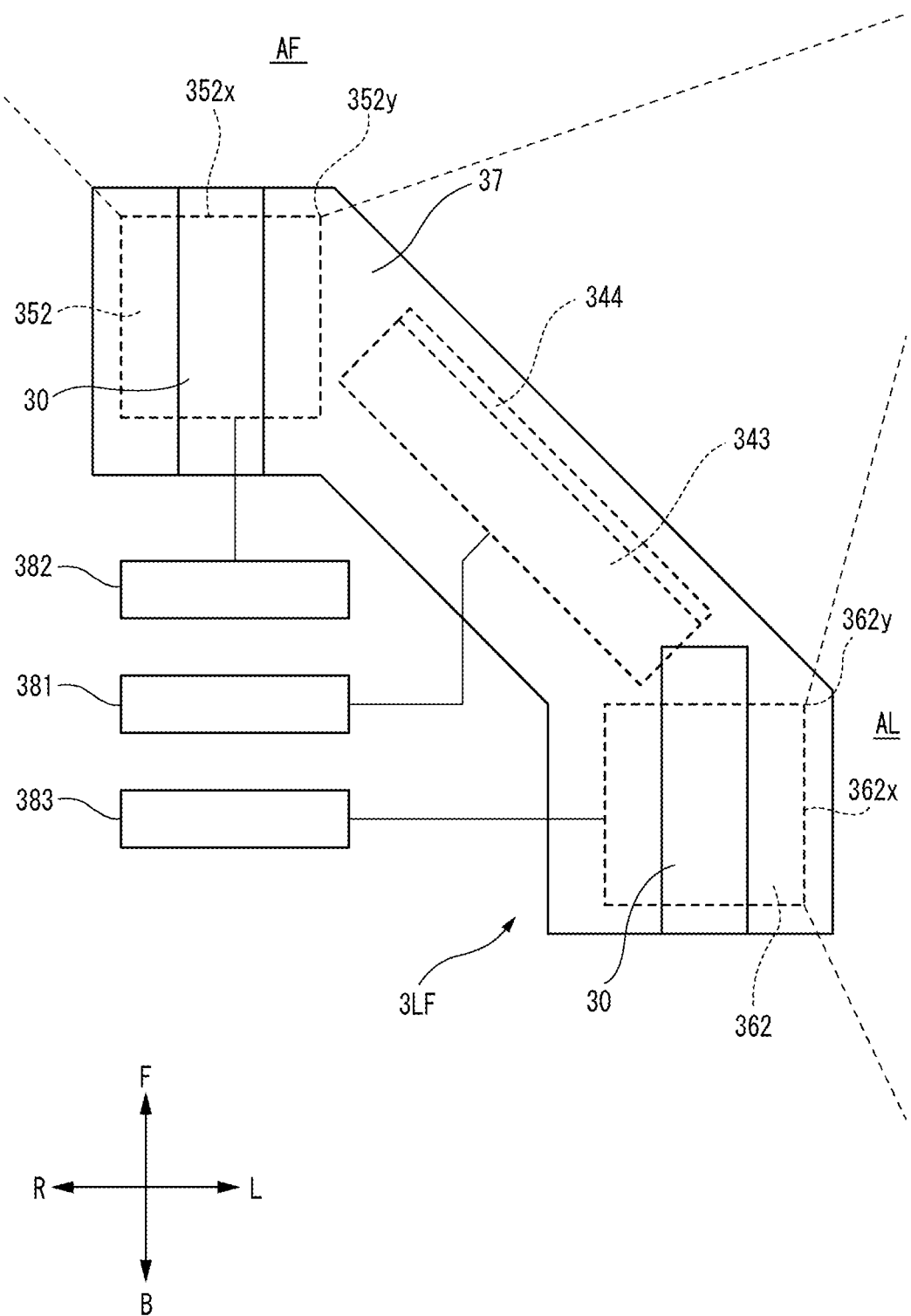
FIG. 11 illustrates a portion of the lamp device of FIG. 10.

As illustrated in FIG. 11, the left front lamp device 3LF includes a side sensor adjustment section 383. The side sensor adjustment section 383 includes a screw mechanism or an actuator mechanism that can change at least one of the position and the attitude of the side LiDAR sensor 361 housed in the side sensor housing 362 fixed to the lower supporting member 37. The side sensor adjustment section 383 can adjust the reference sensing position of the side LiDAR sensor 361 by changing at least one of the position and the attitude of the side LiDAR sensor 361.

Alternatively, the side LiDAR sensor 361 may be immovable relative to the side sensor housing 362, i.e., the lower supporting member 37. In this case, instead of adjusting the reference sensing position of the side LiDAR sensor 361, the side sensor adjustment section 383 may be configured to correct the signals outputted from the side LiDAR sensor 361 so as to obtain a result equivalent to the case where the reference sensing position is adjusted.

Generally, the accuracy required for adjusting the reference sensing position of the side LiDAR sensor 361 is lower than the accuracy required for adjusting the reference light-emitting direction of the light source 341. In other words, in order to accurately adjust the reference light-emitting direction of the light source 341, it is preferable that the degree of freedom relating to the attitude change of the lamp housing 343 is high.

In the present embodiment, both the lamp housing 343 and the side sensor housing 362 arranged in the direction corresponding to the front-rear direction of the vehicle are supported by the common lower supporting member 37, thereby defining the positional relationship between the two housings. Moreover, the maximum dimension UD7 of the side sensor housing 362 in the direction corresponding to the up-down direction of the vehicle 100 is intentionally made larger than the maximum dimension UD5 of the lamp housing 343 in the direction corresponding to the up-down direction of the vehicle 100. As a result, a space having a high degree of freedom for changing the attitude of the lamp housing 343 can be secured ahead of the side sensor housing 362.

Accordingly, in a case where the reference light-emitting direction of the light source 341 and the reference sensing position of the side LiDAR sensor 361 are configured to be individually adjustable, the degree of freedom in adjusting the reference light-emitting direction of the light source 341 requiring higher accuracy can be increased although the positioning of the lamp housing 343 and the positioning of the side sensor housing 362 are kept easy. That is, it is possible to provide a configuration capable of efficiently adjusting the reference light-emitting direction of the light source 341 and the reference sensing position of the side LiDAR sensor 361.

The left front lamp unit 3LF according to the present embodiment includes the front LiDAR sensor 351 and the side LiDAR sensor 361. However, a configuration in which either one of the front LiDAR sensor 351 and the side LiDAR sensor 361 is provided can also be adopted.

In the case where both the front LiDAR sensor 351 and the side LiDAR sensor 361 are provided, the front LiDAR sensor 351 (an example of the first sensor) and the side LiDAR sensor 361 (an example of the second sensor) can be regarded as sensors for sensing external information of the vehicle 100 in different manners.

In this case, as illustrated in FIGS. 10 to 12, the lamp housing 343 is located between the front sensor housing 352 and the side sensor housing 362. An upper end 343a of the lamp housing 343 is located below an upper end 352a of the front sensor housing 352 and an upper end 362a of the side sensor housing 362. A lower end 343b of the lamp housing 343 is located above a lower end 352b of the front sensor housing 352 and a lower end 362b of the side sensor housing 362.

According to such a configuration, a space with a high degree of freedom for changing the attitude of the lamp housing 343 can be secured between the front sensor housing 352 and the side sensor housing 362.

Specifically, as illustrated in FIG. 11, the front sensor housing 352 has a sensing surface 352x (an example of the first sensing surface). The sensing surface 352x faces a forward area AF of the vehicle 100 (an example of the first outside area of the vehicle) from which information is acquired by the front LiDAR sensor 351.

On the other hand, the side sensor housing 362 has a sensing surface 362x (an example of the second sensing surface). The sensing surface 362x faces a left area AL of the vehicle 100 (an example of the second outside area of the vehicle) from which information is acquired by the side LiDAR sensor 361.

The lamp housing 343 is located between the front sensor housing 352 and the side sensor housing 362 on a side corresponding to the inside of the vehicle 100 with respect to the front area AF and the left area AL. Specifically, the lamp housing 343 is disposed on the side corresponding to the rear in the front-rear direction of the vehicle 100 with respect to the front area AF, and on the side corresponding to the right in the left-right direction of the vehicle 100 with respect to the left area AL.

As described above referring to the left front lamp device 1LF according to the first embodiment, according to such a configuration, it is possible to suppress the incidence of stray light caused by reflections and scattering by the lamp housing 343 on the front LiDAR sensor 351 and the side LiDAR sensor 361.

When the distance between the sensors is shortened in order to downsize the lamp device, the sensing areas of the sensors approach or overlap to each other. This makes it easy to prevent a blind spot of the sensor from occurring around the vehicle. If the arrangement condition of the lamp housing 343 is determined as described above, the lamp housing 343 will not be located in the sensing area of each sensor.

That is, the distance between the three items can be minimized while employing a configuration in which the lamp housing 343, the front sensor housing 352, and the side sensor housing 362 are individually provided. Therefore, it is possible to provide a compact left front lamp device 3LF while suppressing the detection of stray light by the front LiDAR sensor 351 and the side LiDAR sensor 361.

In addition, since the lamp housing 343, the front sensor housing 352, and the side sensor housing 362 are supported by the common lower supporting unit 37, positioning between the three housings can be facilitated.

More specifically, when viewed from the up-down direction of the vehicle 100, the lamp housing 343 is located on the side corresponding to the inside of the vehicle 100 (i.e., the rear side in the front-rear direction of the vehicle 100) than an end portion 352y of the sensing surface 352x of the front sensor housing 352 on the side closer to the sensing surface 362x of the side sensor housing 362. In addition, the lamp housing 343 is located on the side corresponding to the inside of the vehicle 100 (i.e., the right side in the left-right direction of the vehicle 100) with respect to an end portion 362y of the sensing surface 362x of the side sensor housing 362 on the side closer to the sensing surface 352x of the front sensor housing 352.

According to such a configuration, it is possible to effectively suppress the incidence of stray light caused by back reflection or back scattering by the lamp housing 343 on the sensing surface 352x of the front sensor housing 352 and the sensing surface 362x of the side sensor housing 362. Therefore, it is possible to further suppress the detection of stray light by the front LiDAR sensor 351 and the detection of stray light by the side LiDAR sensor 361.

As illustrated in FIGS. 10 and 12, the upper end 343a of the lamp housing 343 is located below the upper end 352a of the front sensor housing 352 and the upper end 362a of the side sensor housing 362. A lower end 343b of the lamp housing 343 is located above a lower end 352b of the front sensor housing 352 and a lower end 362b of the side sensor housing 362.

According to such a configuration, a space with a high degree of freedom for changing the attitude of the lamp housing 343 by the lamp adjustment section 381 can be secured between the front sensor housing 352 and the side sensor housing 362.

The sensors housed in the front sensor housing 352 and the side sensor housing 362 need not be of the same type. The sensors may be appropriately selected from LiDAR sensors, ultrasonic sensors, millimeter wave radars, cameras, and the like.

In the present embodiment, as illustrated in FIG. 10, the maximum dimension LR5 of the lamp housing 343 in the direction corresponding to the left-right direction of the vehicle 100 is larger than the maximum dimension UD5 in the direction corresponding to the up-down direction of the vehicle 100.

According to such a configuration, a plurality of light sources 341 can be arranged at least in a direction corresponding to the left-right direction of the vehicle 100 while utilizing a space formed by at least one of the front sensor housing 352 and the side sensor housing 362 that allows the attitude of the lamp housing 343 to be changed. Therefore, it is possible to increase the amount of light emitted from the lamp housing 343 while increasing the utilization efficiency of the space.

As illustrated in FIG. 10, the left front lamp device 3LF in accordance with the present embodiment includes an upper supporting member 39 (one example of the second supporting member). The upper supporting member 39 supports the front sensor housing 352 with the lower supporting member 37 therebetween.

According to such a configuration, the positioning accuracy of the front sensor housing 352 can be improved. As a result, the positioning accuracy of the lamp housing 343 supported via the common lower supporting member 37 can also be improved. As a result, it is possible to improve the adjustment accuracy of the reference light-emitting direction of the light source 341 and the reference sensing position of the front LiDAR sensor 351.

As illustrated in FIG. 12, the upper supporting member 39 supports a side sensor housing 362 with the lower supporting member 37 therebetween.

According to such a configuration, the positioning accuracy of the side sensor housing 362 can be enhanced. As a result, the positioning accuracy of the lamp housing 343 supported via the common lower supporting member 37 can also be improved. As a result, it is possible to improve the adjustment accuracy of the reference light-emitting direction of the light source 341 and the reference sensing position of the side LiDAR sensor 361.

As illustrated in FIGS. 10 to 12, the left-front lamp device 3LF according to the present embodiment includes an engagement member 30 (an example of the first engagement member). The engagement member 30 is provided on a lower surface of the lower supporting member 37 and an upper surface of the upper supporting member 39. In the present embodiment, the engagement member 30 is in the form of a protrusion and extends in a direction corresponding to the front-rear direction of the vehicle 100 (an example of the inside-outside direction of the vehicle).

As illustrated in FIG. 10 with dashed lines, the vehicle 100 is provided with a slot 101 for mounting the left front lamp device 3LF. The slot 101 is open toward the outside of the vehicle 100. The slot 101 extends in the vehicle body of the vehicle 100 in the front-rear direction of the vehicle 100. An engagement member 102 (an example of the second engagement member) is formed on an inner circumferential surface of the slot 101. In the present embodiment, the engagement member 102 is in the form of a groove and extends in the front-rear direction of the vehicle 100.

The left front lamp device 3LF is inserted into the vehicle body of the vehicle 100 through the opening of the slot 101. At this time, the engagement member 30 of the left front lamp device 3LF engages with the engagement member 102 of the vehicle 100, thereby guiding the inserting operation of the left front lamp device 3LF. Moreover, the left front lamp device 3LF is positioned with respect to the vehicle 100.

According to such a configuration, the positioning accuracy of the lamp housing 343, the front sensor housing 352, and the side sensor housing 362 with respect to the vehicle 100 can be improved. As a result, it is possible to improve the adjustment accuracy of the reference light-emitting direction of the light source 341, the reference sensing position of the front LiDAR sensor 351, and the reference sensing position of the side LiDAR sensor 361.

In the present embodiment, two engagement members 30 are provided on each of the lower supporting member 37 and the upper supporting member 39. However, the number and the position of the engagement members 30 may be appropriately determined according to the relation with the vehicle 100 to which the left front lamp device 3LF is mounted. For example, the engagement member 30 provided on the upper supporting member 39 may be omitted.

In the present embodiment, the left front lamp device 3LF is inserted into the slot 101 extending within the vehicle body of the vehicle 100 in the front-rear directions of the vehicle 100. However, the direction in which the slot 101 extends may be appropriately determined according to the specification of the vehicle 100. The direction in which the engagement member 30 of the left front lamp device 3LF and the engagement member 102 of the vehicle 100 extend is determined in accordance with the direction in which the slot 101 extend (i.e., the inside-outside direction of the vehicle). For example, in a case where the slot 101 extends in the left-right direction of the vehicle 100, the engagement member 102 may be formed so as to extend in the left-right direction of the vehicle 100, and the engagement member 30 may be provided so as to extend in a direction corresponding to the left-right direction of the vehicle 100.

In the present embodiment, the engagement member 30 provided on the left front lamp device 3LF is in the form of a rib, whereas the engagement member 102 provided in the slot 101 of the vehicle 100 is in the form of a groove. However, the engagement member 30 may take the form of a groove whereas the engagement member 102 may take the form of a rib As illustrated in FIG. 11 with dashed lines, a translucent cover 344 may be attached to the lamp housing 343. In this case, the translucent cover 344 is attached to the lamp housing 343 so as to allow the passage of the light emitted from the light source 341. The translucent cover 344 may have a lens function. In this case, it is possible to cause the lamp housing 343 to emit light whose traveling direction is more appropriately controlled, and it is possible to further suppress the detection of stray light by the front LiDAR sensor 351 and the side LiDAR sensor 361.

In this case, the maximum dimension of the translucent cover 344 in the direction corresponding to the left-right direction of the vehicle 100 is larger than the maximum dimension of the direction corresponding to the up-down direction of the vehicle 100. The maximum dimension of the light translucent cover 344 in the direction corresponding to the up-down direction of the vehicle 100 is smaller than the maximum dimensions of the front sensor housing 352 and the side sensor housing 362 in the same direction.

Further, when viewed from the up-down direction of the vehicle 100, the translucent cover 344 is located on the side corresponding to the inside of the vehicle 100 (i.e., the rear side in the front-rear direction of the vehicle 100) with respect to the end portion 352$y$ of the sensing surface 352$x$ of the front sensor housing 352 on the side closer to the sensing surface 362$x$ of the side sensor housing 362. In addition, the translucent cover 344 is located on the side corresponding to the inside of the vehicle 100 (i.e., the right side in the left-right direction of the vehicle 100) with respect to the end portion 362$y$ of the sensing surface 362$x$ of the side sensor housing 362 on the side closer to the sensing surface 352$x$ of the front sensor housing 352.

In addition to or in place of the transparent cover 344, the left front lamp device 3LF may include a transparent cover supported by at least one of the lower supporting member 37 and the upper supporting member 39 to allow passage of light emitted from the light source 341.

In the present embodiment, the left front lamp device 3LF and the right front lamp device 3RF are exemplified as the lamp device. However, the configuration described referring to the left front lamp device 3LF is also applicable to a left rear lamp device to be disposed in the left rear corner portion of the vehicle 100 illustrated in FIG. 1 and a right rear lamp device to be disposed in a right rear corner portion of the vehicle 100. For example, the left rear lamp device may have a symmetrical configuration with the left front lamp device 3LF relative to the front-rear direction of the vehicle 100. The right rear lamp unit may have a symmetrical configuration with the left rear lamp device relative to the left-right direction of the vehicle 100.

The above embodiments are merely examples for facilitating understanding of the gist of the presently disclosed subject matter. The configuration according to each of the above embodiments can be appropriately modified or improved without departing from the gist of the presently disclosed subject matter. It is also obvious that equivalents are included within the claimed subject matter.

Figure 13:
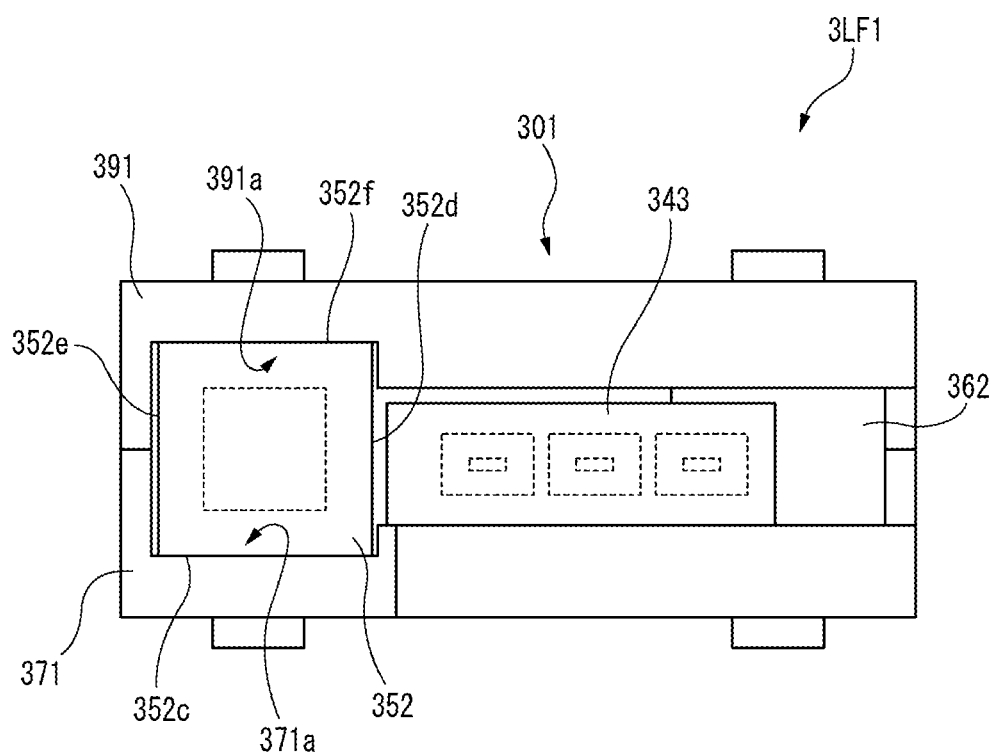
FIG. 13 illustrates a portion of a lamp device according to a first modification example of the third embodiment.
Figure 13:
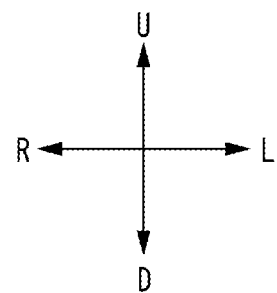
Figure 14:
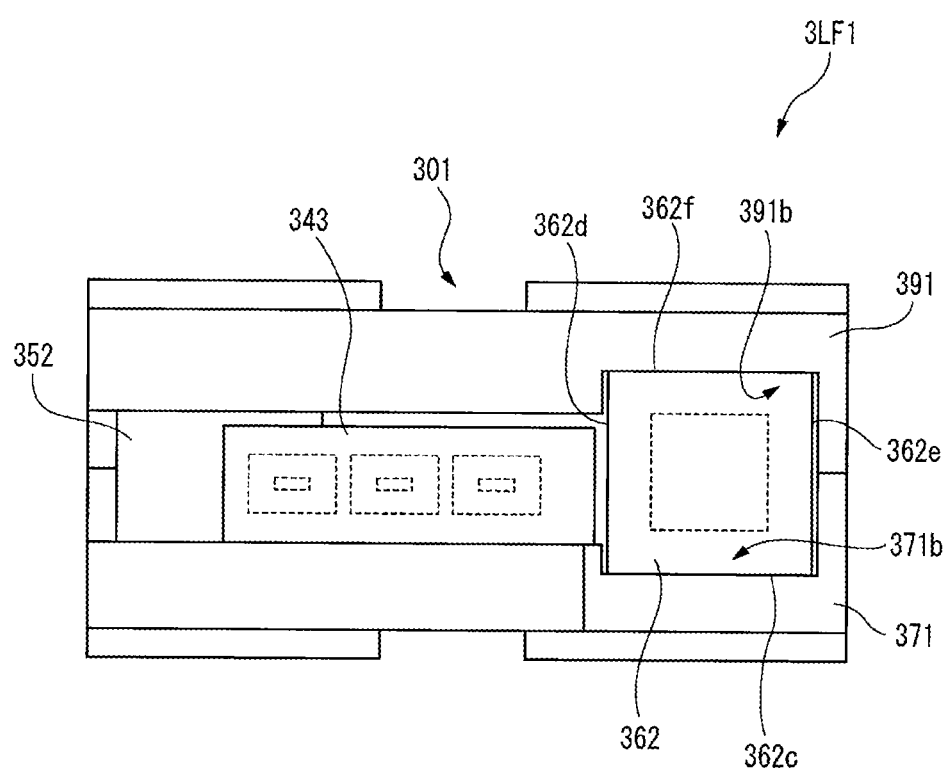
FIG. 14 illustrates a portion of the lamp device of FIG. 13.
Figure 14:
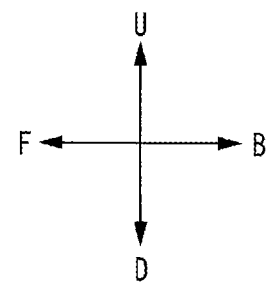

FIGS. 13 and 14 illustrate a left front lamp device 3LF1 according to a first modification example of the third embodiment. FIG. 13 illustrates an external appearance of the left front lamp device 3LF1 as seen from the front side of the vehicle 100. FIG. 14 illustrates an external appearance of the left front lamp device 3LF1 as seen from the left side of the vehicle 100.

In the left front lamp device 3LF according to the third embodiment, the lower supporting member 37 and the upper supporting member 39 are separated from each other such that the lamp housing 343, the front sensor housing 352, and the side sensor housing 362 are located therebetween. On the other hand, the left front lamp device 3LF1 according to the first modification example includes a lower supporting member 371 and an upper supporting member 391. A portion of the lower supporting member 371 and a portion of the upper supporting member 391 are in contact to form a housing 301 enclosing the lamp housing 343, the front sensor housing 352, and the side sensor housing 362. That is, the lower supporting member 371 (an example of the first supporting member) and the upper supporting member 391 (an example of the second supporting member) form a portion of the housing 301 that encloses the lamp housing 343, the front sensor housing 352, and the side sensor housing 362.

According to such a configuration, the lamp housing 343, the front sensor housing 352, and the side sensor housing 362 can be protected from interferences with external members during an operation for mounting the left front lamp device 3LF1 on the vehicle 100, for example. As a result, it is possible to improve the adjustment accuracy of the reference light-emitting direction of the light source 341, the reference sensing position of the front LiDAR sensor 351, and the reference sensing position of the side LiDAR sensor 361.

As illustrated in FIG. 13, the front sensor housing 352 has a bottom surface 352c, a left side surface 352d, and a right side surface 352e. The lower surface 352c and the left side surface 352d (an example of the first outer surfaces) extend in intersecting directions. The lower surface 352c and the right side surface 352e (an example of the first outer surfaces) extend in intersecting directions. The lower supporting member 371 forming the inner surface of the housing 301 has a portion 371a extending along the lower surface 352c, the left side surface 352d, and the right side surface 352e.

According to such a configuration, the positioning accuracy of the front sensor housing 352 can be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the front LiDAR sensor 351.

It should be noted that a portion of the lower supporting member 371 extending along the left side surface 352d of the front sensor housing 352 may be omitted.

The front sensor housing 352 further includes an upper surface 352f. The upper surface 352f and the left side surface 352d (an example of the first outer surfaces) extend in intersecting directions. The upper surface 352f and the right side surface 352e (an example of the first outer surfaces) extend in intersecting directions. The upper supporting member 391 forming the inner surface of the housing 301 has a portion 391a extending along the upper surface 352f, the left side surface 352d, and the right side surface 352e.

In addition to or instead of the above-described structure related to the lower supporting member 371, by having such a configuration, the positioning accuracy of the front sensor housing 352 can also be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the front LiDAR sensor 351.

It should be noted that a portion of the upper supporting member 391 extending along the left side surface 352d of the front sensor housing 352 may be omitted.

As illustrated in FIG. 14, the side sensor housing 362 has a lower surface 362c, a front surface 362d, and a rear surface 362e. The lower surface 362c and the front surface 362d (an example of the second outer surfaces) extend in intersecting directions. The lower surface 362c and the rear surface 362e (an example of the second outer surfaces) extend in intersecting directions. The lower supporting member 371 forming the inner surface of the housing 301 has a portion 371b extending along the lower surface 362c, the front surface 362d, and the rear surface 362e.

According to such a configuration, the positioning accuracy of the side sensor housing 362 can be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the side LiDAR sensor 361.

It should be noted that a portion of the lower supporting member 371 extending along the front surface 362d of the side sensor housing 362 may be omitted.

The side sensor housing 362 further includes an upper surface 362f. The upper surface 362f and the front surface 362d (an example of the second outer surfaces) extend in intersecting directions. The upper surface 362f and the rear surface 362e (an example of the second outer surfaces) extend in intersecting directions. The upper supporting member 391 forming the inner surface of the housing 301 has a portion 391b extending along the upper surface 362f, the front surface 362d, and the rear surface 362e.

In addition to or instead of the above-described structure related to the lower supporting member 371, by having such a configuration, the positioning accuracy of the side sensor housing 362 can also be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the side LiDAR sensor 361.

It should be noted that a portion of the upper supporting member 391 extending along the front surface 362d of the side sensor housing 362 may be omitted.

Figure 15:
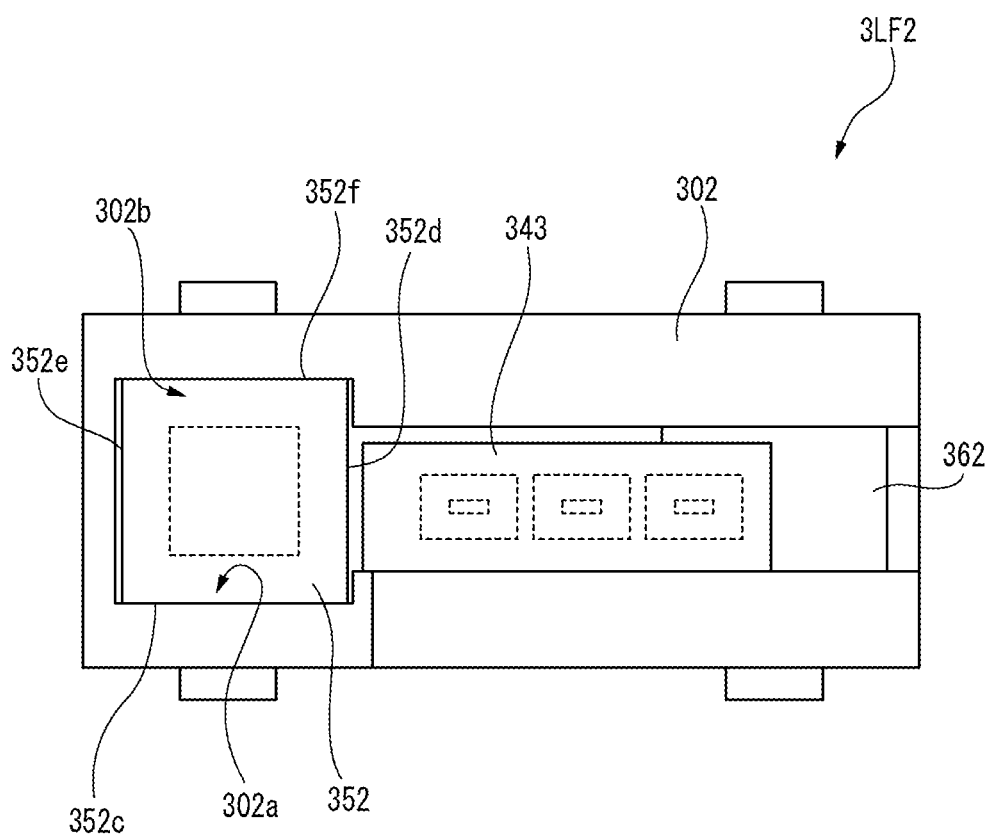
FIG. 15 illustrates a portion of a lamp device according to a second modification example of the third embodiment.
Figure 15:
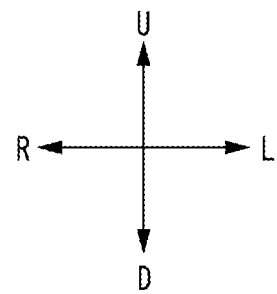
Figure 16:
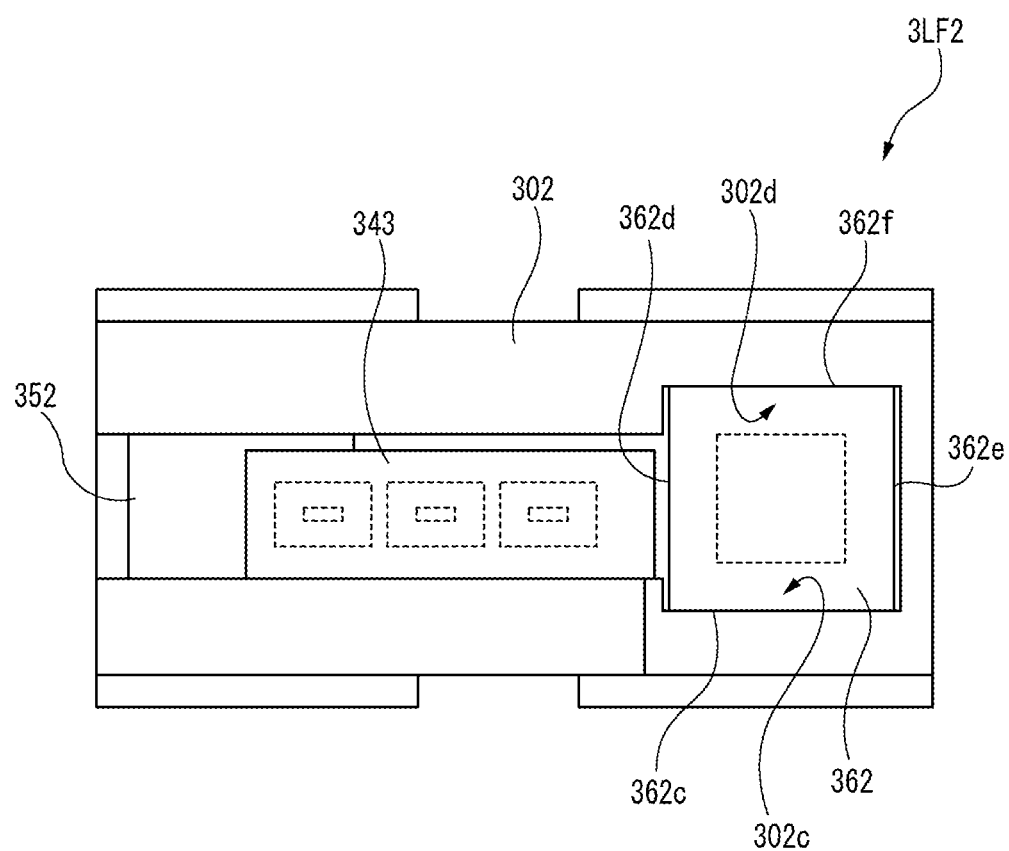
FIG. 16 illustrates a portion of the lamp device of FIG. 15.
Figure 16:
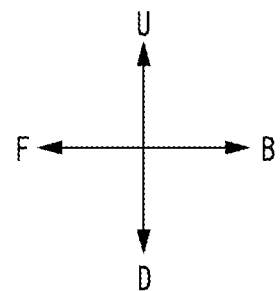

FIGS. 15 and 16 illustrate a left front lamp device 3LF2 according to a second modification example of the third embodiment. FIG. 15 illustrates an external appearance of the left front lamp device 3LF2 as seen from the front side of the vehicle 100. FIG. 16 illustrates an external appearance of the left front lamp device 3LF2 as seen from the left side of the vehicle 100.

In the left front lamp device 3LF1 according to the first modification example, the lower supporting member 371 and the upper supporting member 391 that are separately provided form a housing 301 enclosing the lamp housing 343, the front sensor housing 352, and the side sensor housing 362. On the other hand, the left front lamp device 3LF2 according to the second modification example includes an integral housing 302 enclosing the lamp housing 343, the front sensor housing 352, and the side sensor housing 362.

As illustrated in FIG. 15, the housing 302 has an inner surface 302a extending along the lower surface 352c, the left side surface 352d, and the right side surface 352e of the front sensor housing 352.

According to such a configuration, the positioning accuracy of the front sensor housing 352 can be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the front LiDAR sensor 351.

It should be noted that a portion of the inner surface 302a of the housing 302 extending along the left side surface 352d of the front sensor housing 352 may be omitted.

The housing 302 has an inner surface 302b extending along the upper surface 352f, the left side surface 352d, and the right side surface 352e of the front sensor housing 352.

The inclusion of the inner surface 302b in addition to or in place of the inner surface 302a may further improve the positioning accuracy of the front sensor housing 352. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the front LiDAR sensor 351.

It should be noted that a portion of the inner surface 302b of the housing 302 extending along the left side surface 352d of the front sensor housing 352 may be omitted.

As illustrated in FIG. 16, the housing 302 has the inner surface 302c that extends along the lower surface 362c, the front surface 362d, and the rear surface 362e of the side sensor housing 362.

According to such a configuration, the positioning accuracy of the side sensor housing 362 can be further improved. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the side LiDAR sensor 361.

It should be noted that a portion of the inner surface 302c of the housing 302 extending along the front surface 362d of the side sensor housing 362 may be omitted.

The housing 302 has an inner surface 302d that extends along an upper surface 362f, the front surface 362d, and the rear surface 362e of the side sensor housing 362.

Having the inner surface 302d in addition to or in place of the inner surface 302c can also further improve the positioning accuracy of the side sensor housing 362. As a result, the positioning accuracy of the lamp housing 343 supported via the common lower supporting member 371 can also be improved. As a result, it is possible to improve the adjustment accuracy of the reference light-emitting direction of the light source 341 and the reference sensing position of the side LiDAR sensor 361.

It should be noted that a portion of the inner surface 302d of the housing 302 extending along the front surface 362d of the side sensor housing 362 may be omitted.

In the embodiments described above, the supporting member that supports the lamp housing is individual from each of the front sensor housing and the side sensor housing. However, the supporting member that supports the lamp housing may be integral with at least one of the front sensor housing and the side sensor housing. Here, the term "integral" means that the two functional elements constitute a monolithic article.

Figure 17:
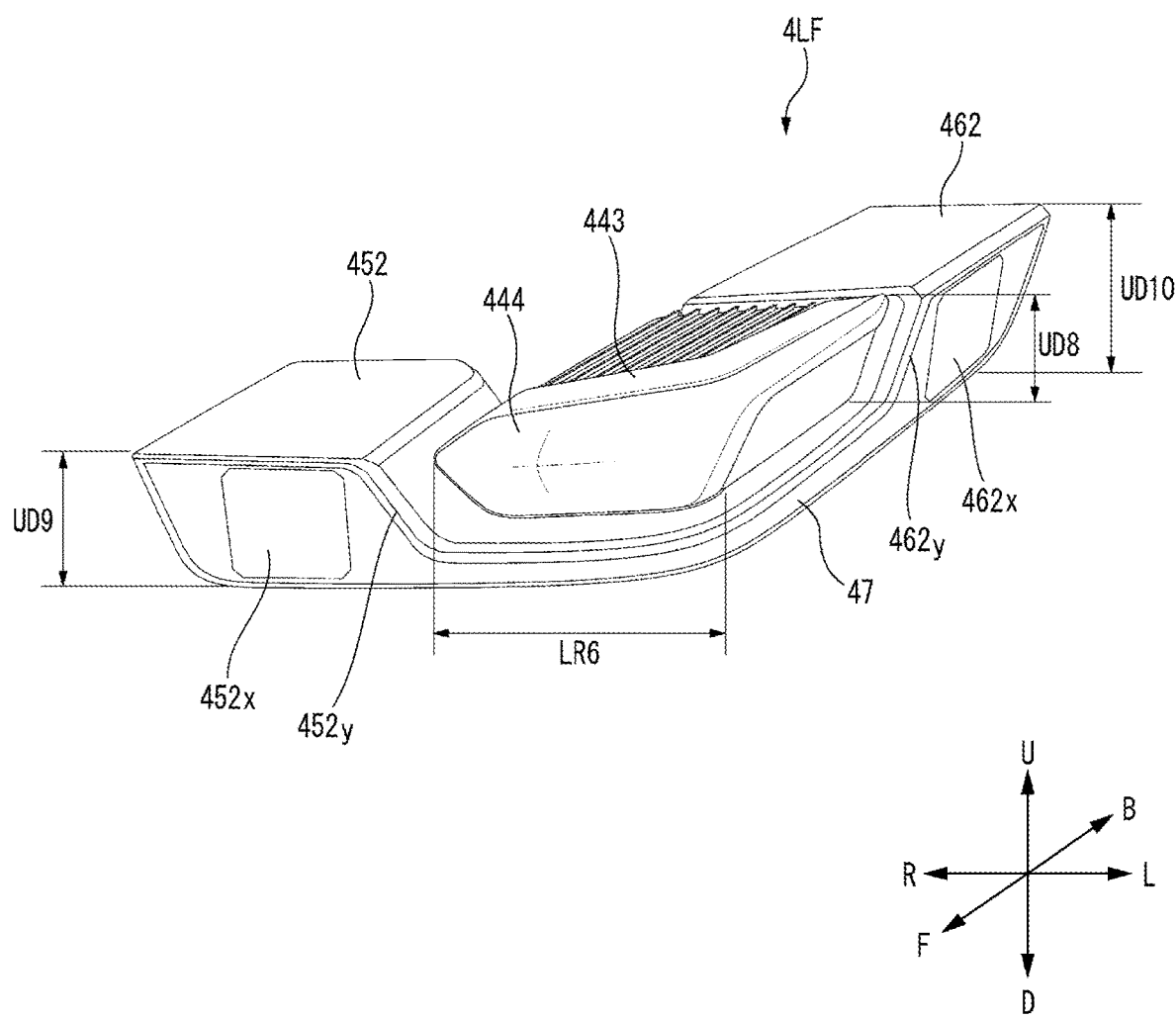
FIG. 17 illustrates an external appearance of a lamp device according to a fourth embodiment.

FIG. 17 illustrates a left front lamp device 4LF according to a fourth embodiment having such a configuration. The left front lamp device 4LF is adapted to be mounted on the left front corner portion of the vehicle 100.

The left front lamp device 4LF includes a lamp housing 443, a front sensor housing 452, a side sensor housing 462, and a supporting portion 47.

The lamp housing 443 houses a light source. As the light source, a lamp light source or a light emitting element can be used. Examples of lamp light sources include incandescent lamps, halogen lamps, discharge lamps, neon lamps, and the like. Examples of the light emitting element include a light emitting diode, a laser diode, and an organic EL element.

The front sensor housing 452 houses a front sensor (an example of the first sensor). The front sensor is a sensor for sensing information of at least an area ahead of the vehicle 100 (an example of the first outside area of the vehicle). The front sensor is appropriately selected from a LiDAR sensor, an ultrasonic sensor, a millimeter wave radar, a camera, and the like.

The side sensor housing 462 houses a side sensor (an example of the second sensor). The side sensor is a sensor for sensing information of at least an area on the left the vehicle 100 (an example of the second outside area of the vehicle). The front sensor is appropriately selected from a LiDAR sensor, an ultrasonic sensor, a millimeter wave radar, a camera, and the like.

The supporting portion 47 (an example of the first supporting member) is located below the lamp housing 443. The supporting portion 47 supports the lamp housing 443. The supporting portion 47 constitutes a monolithic article with the front sensor housing 452 and the side sensor housing 462. That is, the supporting portion 47 supports the lamp housing 443, the front sensor housing 452, and the side sensor housing 462.

The lamp housing 443 and the front sensor housing 452 are arranged in a direction corresponding to the left-right direction of the vehicle 100 when viewed from the front of the vehicle 100 (an example of the direction corresponding to the front-rear direction of the vehicle).

The maximum dimension UD8 of the lamp housing 443 in the direction corresponding to the up-down direction of the vehicle 100 is smaller than the maximum dimension UD9 of the front sensor housing 452 in the direction corresponding to the up-down direction of the vehicle 100. As described with reference to the above embodiments, according to such a configuration, the reference light-emitting direction of the light source and the reference sensing position of the front sensor can be efficiently adjusted.

The lamp housing 443 and the side sensor housing 462 are arranged in a direction corresponding to the front-rear direction of the vehicle 100 when viewed from the left side of the vehicle 100 (an example of the direction corresponding to the left-right direction of the vehicle).

The maximum dimension UD8 of the lamp housing 443 in the direction corresponding to the up-down direction of the vehicle 100 is smaller than the maximum dimension UD10 of the side sensor housing 462 in the direction corresponding to the up-down direction of the vehicle 100. As described with reference to the above embodiments, according to such a configuration, the reference light-emitting direction of the light source and the reference sensing position of the side sensor can be efficiently adjusted.

The maximum dimension LR6 corresponding to the left-right direction of the vehicle 100 of the lamp housing 443 is larger than the maximum dimension UD8 corresponding to the up-down direction of the vehicle 100. The left front lamp device 4LF includes a translucent cover 444. The light emitted from the light source passes through the translucent cover 444. The translucent cover 444 may have a lens function.

The maximum dimension of the translucent cover 444 in the direction corresponding to the left-right direction of the vehicle 100 is larger than the maximum dimension of the direction corresponding to the up-down direction of the vehicle 100. The maximum dimension of the light translucent cover 444 in the direction corresponding to the up-down direction of the vehicle 100 is smaller than the maximum dimensions of the front sensor housing 452 and the side sensor housing 462 in the same direction.

When viewed from the up-down direction of the vehicle 100, the lamp housing 443 is located on the side corresponding to the inside of the vehicle 100 (i.e., the rear side in the front-rear direction of the vehicle 100) than an end portion 452y of the sensing surface 452x of the front sensor housing 452 on the side closer to the sensing surface 462x of the side sensor housing 462. In addition, the lamp housing 443 is located on the side corresponding to the inside of the vehicle 100 (i.e., the right side in the left-right direction of the vehicle 100) with respect to an end portion 462y of the sensing surface 462x of the side sensor housing 462 on the side closer to the sensing surface 452x of the front sensor housing 452.

When viewed from the up-down direction of the vehicle 100, the translucent cover 444 is located on the side corresponding to the inside of the vehicle 100 (i.e., the rear side in the front-rear direction of the vehicle 100) with respect to the end portion 452y of the sensing surface 452x of the front sensor housing 452 on the side closer to the sensing surface 462x of the side sensor housing 462. In addition, the translucent cover 444 is located on the side corresponding to the inside of the vehicle 100 (i.e., the right side in the left-right direction of the vehicle 100) with respect to the end portion 462y of the sensing surface 462x of the side sensor housing 462 on the side closer to the sensing surface 452x of the front sensor housing 452.

In the present embodiment, the left front lamp device 4LF is exemplified as the lamp device. However, the configuration described referring to the left front lamp device 4LF is also applicable to a right front lamp device to be disposed in the right front corner portion of the vehicle 100, a left rear lamp device to be disposed in the left rear corner portion of the vehicle 100 illustrated in FIG. 1 and a right rear lamp device to be disposed in a right rear corner portion of the vehicle 100. In this case, the right front lamp device has a configuration symmetrical with the left front lamp device 4LF relative to the left-right direction of the vehicle 100. The left rear lamp device may have a symmetrical configuration with the left front lamp device 4LF relative to the front-rear direction of the vehicle 100. The right rear lamp unit may have a symmetrical configuration with the left rear lamp device relative to the left-right direction of the vehicle 100.

In each of the above embodiments, one of the two sensor housings between which the lamp housing is disposed is a front sensor for sensing information of at least an area ahead of the vehicle 100, and the other is a side sensor for sensing information of at least an area on the left of the vehicle 100. However, it is also possible to adopt a configuration in which both of the two sensors are front sensors.

Figure 18:
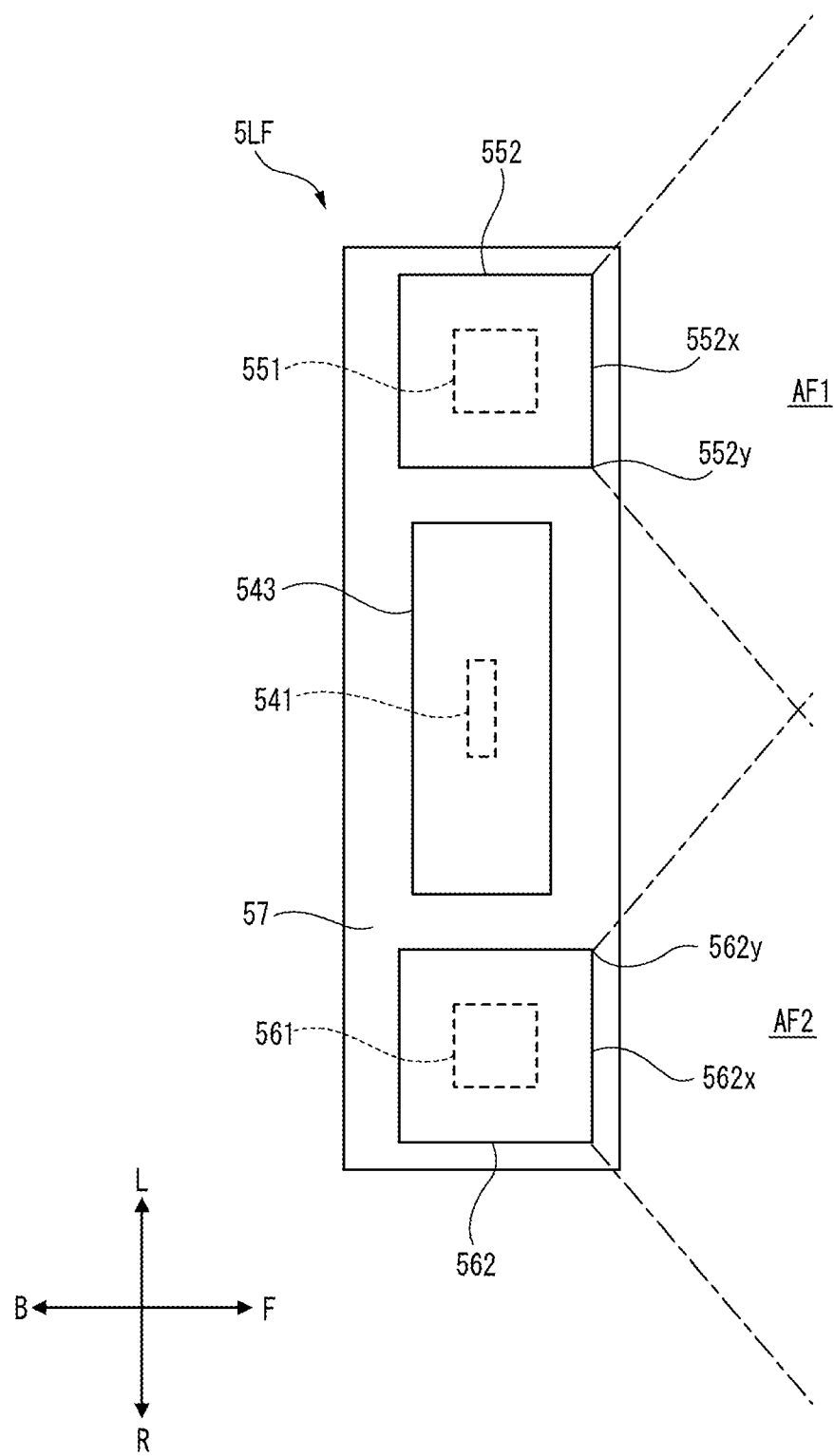
FIG. 18 illustrates a configuration of a lamp device according to a fifth embodiment.

FIG. 18 illustrates a configuration in which a portion of the left front lamp device 5LF according to the fifth embodiment having such a configuration is viewed from the upper side of the vehicle 100. The left front lamp device 5LF is adapted to be mounted on the left front corner portion of the vehicle 100.

The left front lamp device 5LF includes a lamp housing 543, a first sensor housing 552, a second sensor housing 562, and a supporting portion 57.

The lamp housing 543 houses a light source 541. As the light source, a lamp light source or a light emitting element can be used. Examples of lamp light sources include incandescent lamps, halogen lamps, discharge lamps, neon lamps, and the like. Examples of the light emitting element include a light emitting diode, a laser diode, and an organic EL element.

The first sensor housing 552 houses a first front sensor 551 (an example of the first sensor). The first front sensor 551 is a sensor for sensing information of a front area AF1 of the vehicle 100 (an example of the first outside area of the vehicle). The first front sensor 551 is appropriately selected from a LiDAR sensor, an ultrasonic sensor, a millimeter wave radar, a camera, and the like.

The first sensor housing 552 has a sensing surface 552x. The sensing surface 552x faces the front area AF1 from which the first front sensor 551 is to sense information.

The second sensor housing 562 houses a second front sensor 561 (an example of the second sensor). The second front sensor 561 is a sensor for sensing information of a front area AF2 of the vehicle 100 (an example of the second outside area of the vehicle). The second front sensor 561 is appropriately selected from a LiDAR sensor, an ultrasonic sensor, a millimeter wave radar, a camera, and the like.

The second sensor housing 562 has a sensing surface 562x. The sensing surface 562x faces the front area AF2 from which the second front sensor 561 is to sense information.

The front area AF1 and the front area AF2 are different from one another. Accordingly, the first front sensor 551 and the second front sensor 561 may be regarded as sensors that acquire external information of the vehicle 100 in different manners.

The supporting portion 57 (an example of the first supporting member) is located below the lamp housing 543, the first sensor housing 552, and the second sensor housing 562. The supporting portion 57 supports the lamp housing 543, the first sensor housing 552, and the second sensor housing 562.

The lamp housing 543 is located between the first sensor housing 552 and the second sensor housing 562 on the side corresponding to the inside of the vehicle 100 with respect to the front area AF1 and the front area AF2. Specifically, the lamp housing 543 is located on a side of the front area AF1 and the front area AF2 corresponding to the rear side in the front-rear direction of the vehicle 100.

More specifically, when viewed from the up-down direction of the vehicle 100, the lamp housing 543 is located on the side corresponding to the inside of the vehicle 100 (i.e., the rear side in the front-rear direction of the vehicle 100) than an end portion 552y of the sensing surface 552x of the first sensor housing 552 on the side closer to the sensing surface 562x of the second sensor housing 562. In addition, the lamp housing 543 is located on the side corresponding to the inside of the vehicle 100 (i.e., the rear side in the front-rear direction of the vehicle 100) with respect to an end portion 562y of the sensing surface 562x of the second sensor housing 562 on the side closer to the sensing surface 552x of the first sensor housing 552.

In the present embodiment, the left front lamp device 5LF is exemplified as the lamp device. However, the configuration described referring to the left front lamp device 4LF is also applicable to a right front lamp device to be disposed in the right front corner portion of the vehicle 100, a left rear lamp device to be disposed in the left rear corner portion of the vehicle 100 illustrated in FIG. 1 and a right rear lamp device to be disposed in a right rear corner portion of the vehicle 100. In this case, the right front lamp device has a configuration symmetrical with the left front lamp device 4LF relative to the left-right direction of the vehicle 100. The left rear lamp device may have a symmetrical configuration with the left front lamp device 4LF relative to the front-rear direction of the vehicle 100. The right rear lamp unit may have a symmetrical configuration with the left rear lamp device relative to the left-right direction of the vehicle 100.

The present application is based on Japanese Patent Application No. 2016-256296 filed on Dec. 28, 2016 and Japanese Patent Application No. 2016-256297 filed on Dec. 28, 2016, the entire contents of which are incorporated herein by reference.

The invention claimed is:

1. A lamp device adapted to be mounted on a vehicle, comprising:
    a plurality of light sources;
    a first sensor configured to sense external information of the vehicle;
    a lamp housing that houses the light sources;
    a first sensor housing that houses the first sensor; and
    a first supporting member that supports the lamp housing and the first sensor housing,
    wherein the lamp housing and the first sensor housing are arranged in a direction corresponding to a left-right direction of the vehicle when viewed from a direction corresponding to a front-rear direction of the vehicle; and
    wherein a maximum dimension of the lamp housing in a direction corresponding to an up-down direction of the vehicle is smaller than a maximum dimension of the first sensor housing in the same direction.

2. The lamp device according to claim 1, further comprising:
    a second sensor configured to sense external information of the vehicle in a manner that is different from the first sensor; and
    a second sensor housing that houses the second sensor,
    wherein the lamp housing is located between the first sensor housing and the second sensor housing;
    wherein an upper end of the lamp housing is located below an upper end of the first sensor housing and an upper end of the second sensor housing; and
    wherein a lower end of the lamp housing is located above a lower end of the first sensor housing and a lower end of the second sensor housing.

3. The lamp device according to claim 2,
    wherein the second sensor housing is supported by the first supporting member.

4. The lamp device according to claim 1, further comprising:
    a second supporting member that supports the first sensor housing with the first supporting member therebetween.

5. The lamp device according to claim 1,
    wherein the first supporting member is a portion of a casing that encloses the lamp housing and the first sensor housing.

6. The lamp device according to claim 5,
    wherein the first sensor housing has a plurality of outer surfaces extending in intersecting directions; and
    wherein an inner surface of the casing has a portion extending in the outer surfaces.

7. The lamp device according to claim 1,
    wherein the first supporting member has a first engagement member extending in a direction corresponding to an inside-outside direction of the vehicle; and
    wherein the first engagement member is configured to engage with a second engagement member that is provided on the vehicle.

8. The lamp device according to claim 1,
    wherein a maximum dimension of the lamp housing in the direction corresponding to the left-right direction of the vehicle is larger than the maximum dimension thereof in the direction corresponding to the up-down direction of the vehicle.

9. A lamp device adapted to be mounted on a vehicle, comprising:
    a plurality of light sources;
    a first sensor configured to sense external information of the vehicle;
    a lamp housing that houses the light sources;
    a first sensor housing that houses the first sensor; and
    a first supporting member that supports the lamp housing and the first sensor housing,
    wherein the lamp housing and the first sensor housing are arranged in a direction corresponding to a front-rear direction of the vehicle when viewed from a direction corresponding to a left-right direction of the vehicle; and
    wherein a maximum dimension of the lamp housing in a direction corresponding to an up-down direction of the vehicle is smaller than a maximum dimension of the first sensor housing in the same direction.

10. The lamp device according to claim 9, further comprising:
    a second sensor configured to sense external information of the vehicle in a manner that is different from the first sensor; and
    a second sensor housing that houses the second sensor,
    wherein the lamp housing is located between the first sensor housing and the second sensor housing;
    wherein an upper end of the lamp housing is located below an upper end of the first sensor housing and an upper end of the second sensor housing; and
    wherein a lower end of the lamp housing is located above a lower end of the first sensor housing and a lower end of the second sensor housing.

11. The lamp device according to claim 10,
    wherein the second sensor housing is supported by the first supporting member.

12. The lamp device according to claim 9, further comprising:
a second supporting member that supports the first sensor housing with the first supporting member therebetween.

13. The lamp device according to claim 9,
wherein the first supporting member is a portion of a casing that encloses the lamp housing and the first sensor housing.

14. The lamp device according to claim 13,
wherein the first sensor housing has a plurality of outer surfaces extending in intersecting directions; and
wherein an inner surface of the casing has a portion extending in the outer surfaces.

15. The lamp device according to claim 9,
wherein the first supporting member has a first engagement member extending in a direction corresponding to an inside-outside direction of the vehicle; and
wherein the first engagement member is configured to engage with a second engagement member that is provided on the vehicle.

16. The lamp device according to claim 9,
wherein a maximum dimension of the lamp housing in the direction corresponding to the left-right direction of the vehicle is larger than the maximum dimension thereof in the direction corresponding to the up-down direction of the vehicle.

17. A lamp device adapted to be mounted on a vehicle, comprising:
a plurality of light sources;
a first sensor configured to sense external information of the vehicle;
a lamp housing that houses the light sources;
a first sensor housing that houses the first sensor; and
a first supporting member that supports the lamp housing and the first sensor housing,
wherein the lamp housing and the first sensor housing are arranged in a direction corresponding to an up-down direction of the vehicle when viewed from a direction corresponding to a front-rear direction of the vehicle; and
wherein a maximum dimension of the lamp housing in a direction corresponding to a left-right direction of the vehicle is smaller than a maximum dimension of the first sensor housing in the same direction.

18. The lamp device according to claim 17, further comprising:
a second sensor configured to sense external information of the vehicle in a manner that is different from the first sensor; and
a second sensor housing that houses the second sensor,
wherein the lamp housing is located between the first sensor housing and the second sensor housing;
wherein a left end of the lamp housing is located on the right of a left end of the first sensor housing and a left end of the second sensor housing; and
wherein a right end of the lamp housing is located on the left of a right end of the first sensor housing and a right end of the second sensor housing.

19. The lamp device according to claim 18,
wherein the second sensor housing is supported by the first supporting member.

20. The lamp device according to claim 17, further comprising:
a second supporting member that supports the first sensor housing with the first supporting member therebetween.

21. The lamp device according to claim 17,
wherein the first supporting member is a portion of a casing that encloses the lamp housing and the first sensor housing.

22. The lamp device according to claim 21,
wherein the first sensor housing has a plurality of outer surfaces extending in intersecting directions; and
wherein an inner surface of the casing has a portion extending in the outer surfaces.

23. The lamp device according to claim 17,
wherein the first supporting member has a first engagement member extending in a direction corresponding to an inside-outside direction of the vehicle; and
wherein the first engagement member is configured to engage with a second engagement member that is provided on the vehicle.

24. The lamp device according to claim 17,
wherein a maximum dimension of the lamp housing in the direction corresponding to the up-down direction of the vehicle is larger than the maximum dimension thereof in the direction corresponding to the left-right direction of the vehicle.

25. A lamp device adapted to be mounted on a vehicle, comprising:
a plurality of light sources;
a first sensor configured to sense external information of the vehicle;
a lamp housing that houses the light sources;
a first sensor housing that houses the first sensor; and
a first supporting member that supports the lamp housing and the first sensor housing,
wherein the lamp housing and the first sensor housing are arranged in a direction corresponding to a front-rear direction of the vehicle when viewed from a direction corresponding to an up-down direction of the vehicle; and
wherein a maximum dimension of the lamp housing in a direction corresponding to a left-right direction of the vehicle is smaller than a maximum dimension of the first sensor housing in the same direction.

26. The lamp device according to claim 25, further comprising:
a second sensor configured to sense external information of the vehicle in a manner that is different from the first sensor; and
a second sensor housing that houses the second sensor,
wherein the lamp housing is located between the first sensor housing and the second sensor housing;
wherein a left end of the lamp housing is located on the right of a left end of the first sensor housing and a left end of the second sensor housing; and
wherein a right end of the lamp housing is located on the left of a right end of the first sensor housing and a right end of the second sensor housing.

27. The lamp device according to claim 26,
wherein the second sensor housing is supported by the first supporting member.

28. The lamp device according to claim 25, further comprising:
a second supporting member that supports the first sensor housing with the first supporting member therebetween.

29. The lamp device according to claim 25,
wherein the first supporting member is a portion of a casing that encloses the lamp housing and the first sensor housing.

30. The lamp device according to claim 29,
wherein the first sensor housing has a plurality of outer surfaces extending in intersecting directions; and
wherein an inner surface of the casing has a portion extending in the outer surfaces.

31. The lamp device according to claim 25,
wherein the first supporting member has a first engagement member extending in a direction corresponding to an inside-outside direction of the vehicle; and
wherein the first engagement member is configured to engage with a second engagement member that is provided on the vehicle.

32. The lamp device according to claim 25,
wherein a maximum dimension of the lamp housing in the direction corresponding to the up-down direction of the vehicle is larger than the maximum dimension thereof in the direction corresponding to the left-right direction of the vehicle.

* * * * *